(12) United States Patent
Li et al.

(10) Patent No.: US 11,937,330 B2
(45) Date of Patent: Mar. 19, 2024

(54) COOPERATIVE OPERATION WITH SIDELINK DISCONTINUOUS RECEPTION

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/451,727

(22) Filed: Oct. 21, 2021

(65) Prior Publication Data

US 2023/0127560 A1 Apr. 27, 2023

(51) Int. Cl.
*H04W 76/28* (2018.01)
*H04W 76/23* (2018.01)

(52) U.S. Cl.
CPC .................................. *H04W 76/28* (2018.02)

(58) Field of Classification Search
CPC ............................. H04W 76/28; H04W 76/23
USPC .......................................................... 370/329
See application file for complete search history.

(56) References Cited

U.S. PATENT DOCUMENTS

| | | | | |
|---|---|---|---|---|
| 2003/0103599 A1* | 6/2003 | Jijina | ...................... | H04M 3/54 379/211.02 |
| 2014/0112243 A1* | 4/2014 | Suzuki | .................. | H04W 56/00 370/328 |
| 2017/0181218 A1* | 6/2017 | Liu | ........................ | H04W 76/27 |
| 2017/0188411 A1* | 6/2017 | Siomina | ................ | H04W 76/27 |
| 2020/0067664 A1* | 2/2020 | Kim | ...................... | H04L 5/0032 |
| 2022/0303901 A1* | 9/2022 | Yang | ................. | H04W 52/0216 |

OTHER PUBLICATIONS

VIVO: Lsft issues on SL DRX, R2105352 (Year: 2021).*
International Search Report and Written Opinion—PCT/US2022/077016—ISA/EPO—dated Jan. 23, 2023.
VIVO: "SL DRX for Unicast", 3GPP TSG-RAN WG2 Meeting #113bis electronic, R2-2102816, 3rd Generation Partnership Project, Mobile Competence Centre, 650, Route Des Lucioles, F-06921 Sophia-Antipolis Cedex, France, vol. RAN WG2, No. E-Meeting, Apr. 12, 2021-Apr. 20, 2021, Apr. 2, 2021, XP052174400, 10 Pages, chapter 2.2 with chapters 1 and 2.1.
VIVO: "Left issues on SL DRX", 3GPP TSG-RAN WG2 Meeting #114 electronic, R2-2105352, 3rd Generation Partnership Project, Mobile Competence Centre, 650, Route Des Lucioles, F-06921 Sophia-Antipolis Cedex, France, vol. RAN WG2, No. May 19, 2021-May 27, 2021, May 11, 2021, XP052006987, 16 Pages, chapter 2.2 with chapters 1, 2.1 and 2.3.

\* cited by examiner

*Primary Examiner* — Inder P Mehra
(74) *Attorney, Agent, or Firm* — Sevan Savsa; Harrity & Harrity, LLP

(57) ABSTRACT

Various aspects of the present disclosure generally relate to wireless communication. In some aspects, a first user equipment (UE) may identify an active state of a first sidelink (SL) discontinuous reception (DRX) cycle of the first UE and an active state of a second SL DRX cycle of a second UE. The first UE may transmit, to the second UE based at least in part on an overlap between the active state of the first SL DRX cycle and the active state of the second SL DRX cycle, an indication associated with adjusting the first SL DRX cycle or the second SL DRX cycle. Numerous other aspects are described.

30 Claims, 13 Drawing Sheets

COOPERATIVE OPERATION WITH SIDELINK DISCONTINUOUS RECEPTION

FIELD OF THE DISCLOSURE

Aspects of the present disclosure generally relate to wireless communication and to techniques and apparatuses for cooperative operation with sidelink discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include identifying an active state of a first sidelink (SL) discontinuous reception (DRX) cycle of the first UE and an active state of a second SL DRX cycle of a second UE. The method may include transmitting, to the second UE based at least in part on an overlap between the active state of the first SL DRX cycle and the active state of the second SL DRX cycle, an indication associated with adjusting the first SL DRX cycle or the second SL DRX cycle.

Some aspects described herein relate to a method of wireless communication performed by a first UE. The method may include identifying that an active state of a first SL DRX cycle of the first UE overlaps with an active state of a second SL DRX cycle of a second UE. The method may include transmitting, to a second UE based at least in part on identifying that the active state of the first SL DRX cycle overlaps with the active state of the second SL DRX cycle, information associated with an adjustment of the active state of the first SL DRX cycle or the active state of the second SL DRX cycle.

Some aspects described herein relate to an apparatus for wireless communication performed by a first UE. The apparatus may include a memory and one or more processors, coupled to the memory. The one or more processors may be configured to identify an active state of a first SL DRX cycle of the first UE and an active state of a second SL DRX cycle of a second UE. The one or more processors may be configured to transmit, to the second UE based at least in part on an overlap between the active state of the first SL DRX cycle and the active state of the second SL DRX cycle, an indication associated with adjusting the first SL DRX cycle or the second SL DRX cycle.

Some aspects described herein relate to an apparatus for wireless communication performed by a base station. The apparatus may include a memory and one or more processors, coupled to the memory. The one or more processors may be configured to identify that an active state of a first SL DRX cycle of the first UE overlaps with an active state of a second SL DRX cycle of a second UE. The one or more processors may be configured to transmit, to a second UE based at least in part on identifying that the active state of the first SL DRX cycle overlaps with the active state of the second SL DRX cycle, information associated with an adjustment of the active state of the first SL DRX cycle or the active state of the second SL DRX cycle.

Some aspects described herein relate to a non-transitory computer-readable medium that stores a set of instructions for wireless communication by a first UE. The set of instructions, when executed by one or more processors of the first UE, may cause the first UE to identify an active state of a first SL DRX cycle of the first UE and an active state of a second SL DRX cycle of a second UE. The set of instructions, when executed by one or more processors of the first UE, may cause the first UE to transmit, to the second UE based at least in part on an overlap between the active state of the first SL DRX cycle and the active state of the second SL DRX cycle, an indication associated with adjusting the first SL DRX cycle or the second SL DRX cycle.

Some aspects described herein relate to a non-transitory computer-readable medium that stores a set of instructions for wireless communication by a first UE. The set of instructions, when executed by one or more processors of the first UE, may cause the first UE to identify that an active state of a first SL DRX cycle of the first UE overlaps with an active state of a second SL DRX cycle of a second UE. The set of instructions, when executed by one or more processors of the first UE, may cause the first UE to transmit, to a second UE based at least in part on identifying that the active state of the first SL DRX cycle overlaps with the active state of the second SL DRX cycle, information associated with an adjustment of the active state of the first SL DRX cycle or the active state of the second SL DRX cycle.

Some aspects described herein relate to an apparatus for wireless communication. The apparatus may include means for identifying an active state of a first SL DRX cycle of the apparatus and an active state of a second SL DRX cycle of a second apparatus. The apparatus may include means for transmitting, to the second apparatus based at least in part on an overlap between the active state of the first SL DRX cycle and the active state of the second SL DRX cycle, an indication associated with adjusting the first SL DRX cycle or the second SL DRX cycle.

Some aspects described herein relate to an apparatus for wireless communication. The apparatus may include means for identifying that an active state of a first SL DRX cycle of the apparatus overlaps with an active state of a second SL DRX cycle of the apparatus. The apparatus may include means for transmitting, to a second apparatus based at least in part on identifying that the active state of the first SL DRX cycle overlaps with the active state of the second SL DRX cycle, information associated with an adjustment of the active state of the first SL DRX cycle or the active state of the second SL DRX cycle.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
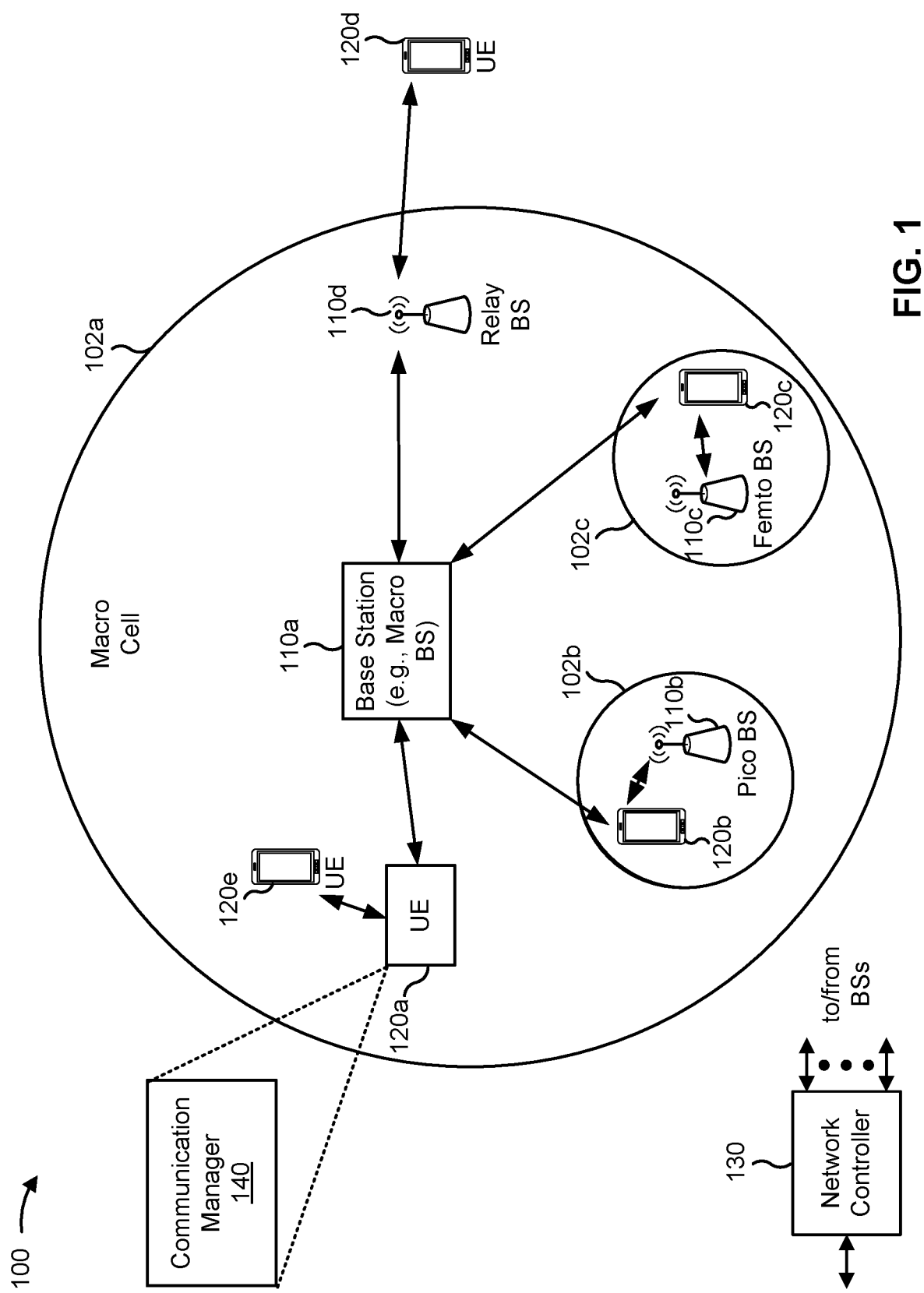
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify an active state of a SL DRX cycle of the first UE and an active state of a second SL DRX cycle of a second UE; and transmit, to the second UE based at least in part on an overlap between the active state of the first SL DRX cycle and the active state of the second SL DRX cycle, an indication associated with adjusting the first SL DRX cycle or the second SL DRX cycle. Additionally, or alternatively, the communication manager 140 may perform one or more other operations described herein.

In some aspects, the UE 120 may include a communication manager 140. As described in more detail elsewhere herein, the communication manager 140 may identify that an active state of a first SL DRX cycle of the first UE overlaps with an active state of a second SL DRX cycle of the first UE; and transmit, to a second UE based at least in part on identifying that the active state of the first SL DRX cycle overlaps with the active state of the second SL DRX cycle, information associated with an adjustment of the active state of the first SL DRX cycle or the active state of the second SL DRX cycle. Additionally, or alternatively, the communication manager 140 may perform one or more other operations described herein.

As indicated above, FIG. 1 is provided as an example. Other examples may differ from what is described with regard to FIG. 1.

Figure 2:
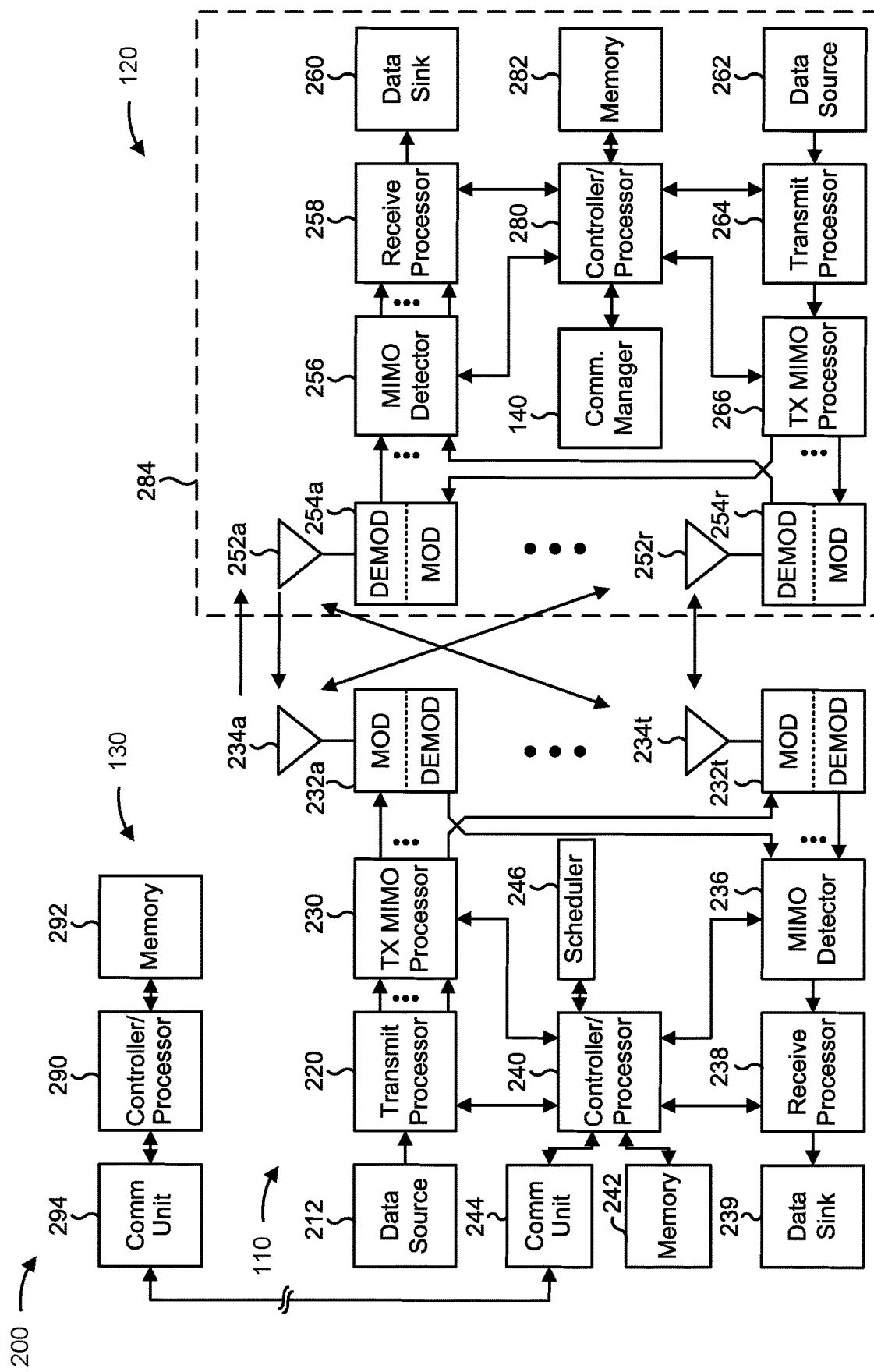
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS), channel state information reference signal (CSI-RS), or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-14).

The controller/processor 240 of the base station 110, the controller/processor 280 of the UE 120, and/or any other component(s) of FIG. 2 may perform one or more techniques associated with cooperative operation with sidelink discontinuous reception, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the first UE includes means for identifying an active state of a first SL DRX cycle of the first UE and an active state of a second SL DRX cycle of a second UE; and/or means for transmitting, to the second UE based at least in part on an overlap between the active state of the first SL DRX cycle and the active state of the second SL DRX cycle, an indication associated with adjusting the first SL DRX cycle or the second SL DRX cycle. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE includes means for identifying that an active state of a first SL DRX cycle of the first UE overlaps with an active state of a second SL DRX cycle of the first UE; and/or means for transmitting, to a second UE based at least in part on identifying that the active state of the first SL DRX cycle overlaps with the active state of the second SL DRX cycle, information associated with an adjustment of the active state of the first SL DRX cycle or the active state of the second SL DRX cycle. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
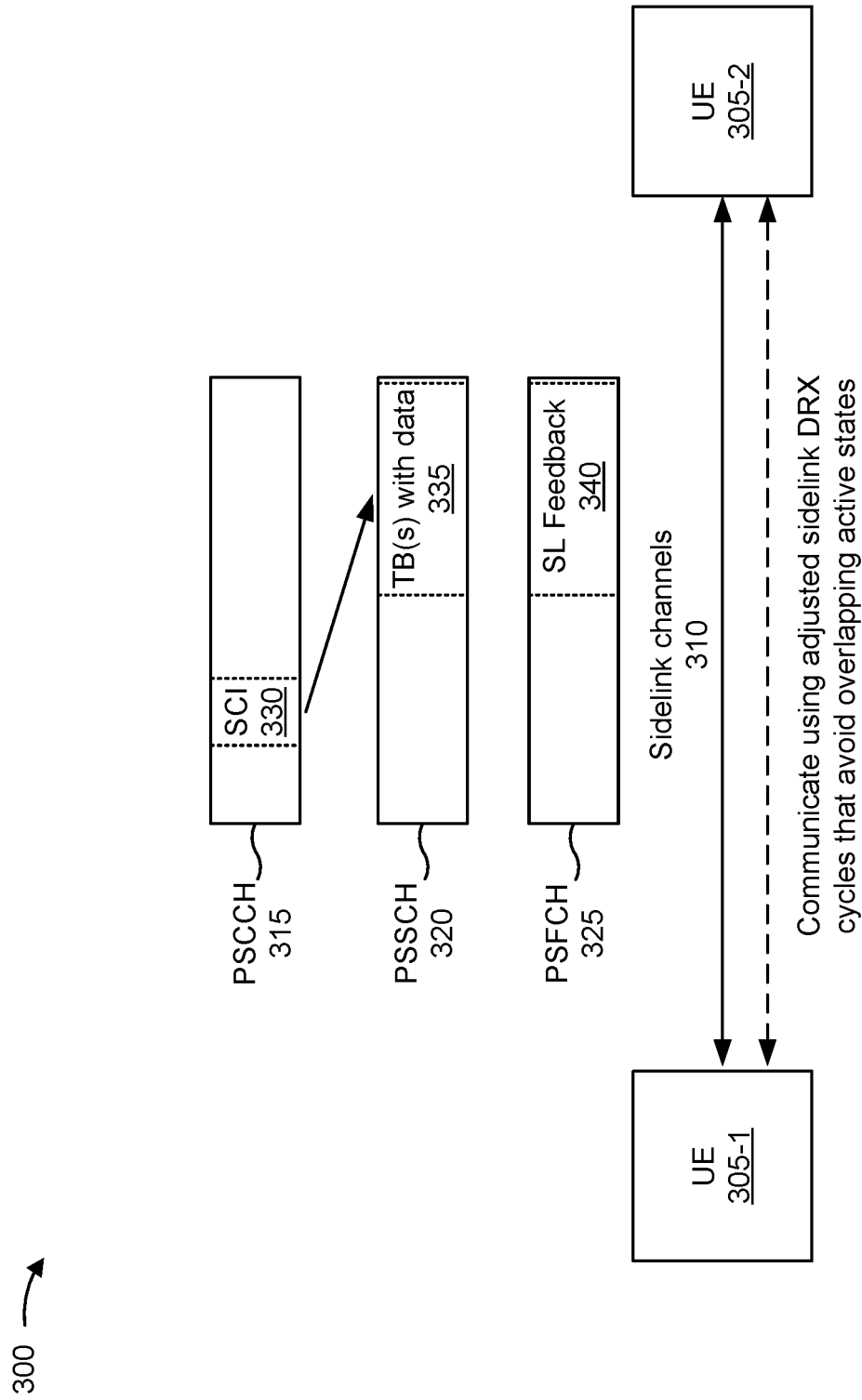
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) of the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARM) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSCCH-RSRP or PSSCH-RSRP parameter) associated with various sidelink channels, and/or may measure a reference signal received quality (RSRQ) parameter (e.g., a PSCCH-RSRQ or PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described herein, the UE 305 may communicate according to a sidelink discontinuous reception (DRX) cycle. The UE 305-1 and UE 305-2 may be configured to communicate using sidelink channels 310 to prevent overlapping transmissions by the UE 305-1 and UE 305-2 during active portions of the DRX cycles associated with the UE 305-1 and UE 305-2 or a default or common sidelink DRX cycle.

As indicated above, FIG. 3 is provided as an example. Other examples may differ from what is described with respect to FIG. 3.

Figure 4:
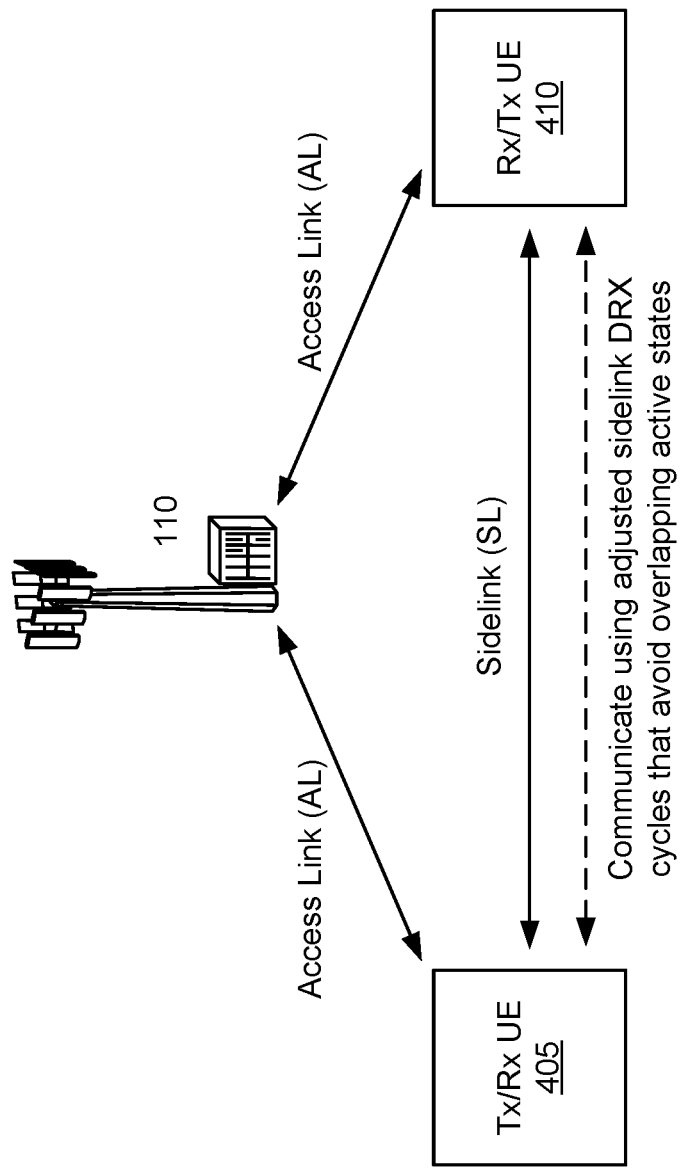
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the UE 405 and/or the UE 410 may receive a DRX configuration from the base station 110. As described further herein, the UE 405 and UE 410 may communicate using sidelink to avoid transmitting during an active portion of the DRX cycle of the other of the UE 405 and UE 410.

As indicated above, FIG. 4 is provided as an example. Other examples may differ from what is described with respect to FIG. 4.

Figure 5:
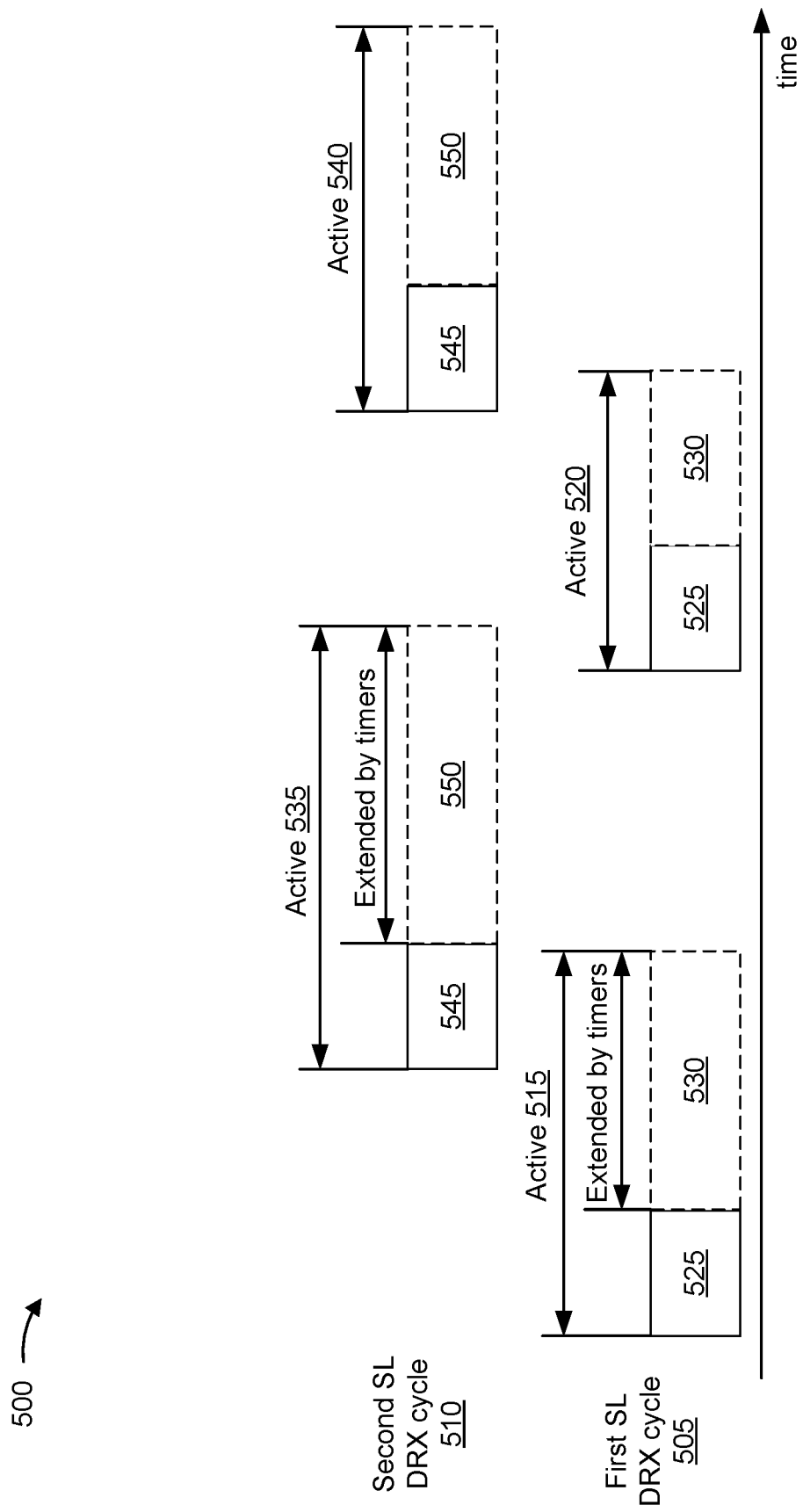
FIG. 5 is a diagram illustrating an example of a sidelink (SL) discontinuous reception (DRX) configuration, in accordance with the present disclosure.

FIG. 5 is a diagram illustrating an example 500 of a sidelink DRX configuration, in accordance with the present disclosure.

In some cases, a sidelink DRX cycle may include a DRX on duration (e.g., during which a UE 120 is awake or in an active state) and an opportunity to enter a DRX sleep state. As used herein, the time during which the UE 120 is configured to be active during the DRX on duration may be referred to as an active state, and the time during which the UE 120 is configured to be in the DRX sleep state may be referred to as an inactive state. As described below, the UE 120 may monitor a PSCCH during the active state, and may refrain from monitoring the PSCCH during the inactive state.

During the DRX on duration (e.g., the active state), the UE 120 may monitor the PSCCH for sidelink control information (SCI) pertaining to the UE 120. If the UE 120 does not detect and/or successfully decode any PSCCH communications intended for the UE 120 during the DRX on duration, then the UE 120 may enter the sleep state at the end of the DRX on duration. In this way, the UE 120 may conserve battery power and reduce power consumption. As shown, the DRX cycle may repeat with a configured periodicity according to the DRX configuration.

If the UE 120 detects and/or successfully decodes a PSCCH communication intended for the UE 120, then the UE 120 may remain in an active state (e.g., awake) for the duration of a DRX inactivity timer (e.g., which may extend the active state). The UE 120 may start the DRX inactivity timer at a time at which the PSCCH communication is received. The UE 120 may remain in the active state until the DRX inactivity timer expires, at which time the UE 120 may enter the sleep state. During the duration of the DRX inactivity timer, the UE 120 may continue to monitor for PSCCH communications and/or may obtain a sidelink data communication (e.g., on a sidelink data channel, such as the PSSCH) scheduled by the PSCCH communication. The UE 120 may restart the DRX inactivity timer after each detection of a PSCCH communication for the UE 120 for an initial transmission (e.g., but not for a retransmission). By operating in this manner, the UE 120 may conserve battery power and reduce power consumption by entering the sleep state.

In some aspects, SL DRX may be supported for unicast, groupcast, and/or broadcast communications. Using SL DRX for unicast, a UE may communicate (e.g., negotiate) with other UEs regarding the SL DRX configuration associated with those UEs. The SL DRX for unicast may be configured per communication direction between paired UEs. For example, the SL DRX configuration may be decided by a transmitter UE for the traffic direction from the transmitter UE to a receiver UE (e.g., using assistance information from the receiver UE). Sidelink DRX for unicast may support an on duration timer, an inactivity timer, a hybrid automatic repeat request (HARQ) round trip time (RTT) timer, or a HARQ retransmission timer. In some cases, if HARQ feedback is enabled (e.g., either via configuration or indication in SCI), a HARQ RTT timer may be started after an ACK or NACK is transmitted by a receiver UE or is received at a transmitter UE (e.g., using sidelink). Both the receiver UE and the transmitter UE may be in the inactive state (e.g., not communicating) while the HARQ RTT timer is running. The HARQ retransmission may be automatically started when the HARQ RTT timer expires, and both the receiver UE and the transmitter UE may be in an active state (e.g., the receiver UE may monitor a retransmission if a NACK has been transmitted, and the transmitter UE may perform a retransmission if a NACK has been received). Using SL for groupcast, the SL DRX may be configured per QoS and layer 2 (L2) destination ID (e.g., SL DRX cycle per QoS, SL DRX offset per L2 Destination ID). Sidelink DRX for groupcast may support an on duration timer, an inactivity timer, a HARQ RTT timer, or a HARQ retransmission timer. Using sidelink for broadcast, the SL DRX may be configured per QoS and L2 destination ID (e.g. SL DRX cycle per QoS, SL DRX offset per L2 Destination ID). Sidelink DRX for broadcast may support an on duration timer.

As shown in FIG. 5, example 500 may include a first SL DRX cycle 505 and a second SL DRX cycle 510. The first SL DRX cycle 505 may include a first active state 515 and a second active state 520. While FIG. 5 shows the first SL DRX cycle 505 having two active states, the first SL DRX cycle 505 may include any number of active states (e.g., active states that repeat periodically), and each of the active states may have any duration. The first active state 515 may include an initial active portion 525 and an extended portion 530. The initial active portion 525 may correspond to a time period during which a UE 120, configured with the first SL DRX cycle 505, is initially active (e.g., receiving or transmitting information, or monitoring a PSCCH) for each of the active states 515 of the first SL DRX cycle 505. For example, a duration of the initial active portion 525 may be defined by an on duration timer. The extended portion 530 may correspond to a time period during which a UE 120, configured with the first SL DRX cycle 505, is optionally active (e.g., if the active state 515 is extended). For example, the extended portion 530 may correspond to an active portion of the first active state 515 that is extended based at least in part on one or more timers (e.g., the inactivity timer or the HARQ retransmission timer). The extended portion 530 of the first SL DRX cycle 505 may be activated during some active states of the first SL DRX cycle 505 and may not be activated during other active states of the first SL DRX cycle 505. For example, the first active state 515 may include an extended portion 530 having a duration X (e.g., 10 ms) while the second active state 520 may not include an extended portion 530. Additionally, or alternatively, the extended portion may have different durations for different active states of the first SL DRX cycle 505. For example, the extended portion 530 of the first active state 515 may have a duration X (e.g., 10 ms) while the extended portion 530 of the second active state 520 may have a duration Y (e.g., 5 ms).

The second SL DRX cycle 510 may include a first active state 535 and a second active state 540. While FIG. 5 shows the second SL DRX cycle 510 having two active states, the second SL DRX cycle 510 may include any number of active states (e.g., active states that repeat periodically), and each of the active states may have any duration. The first active state 535 may include an initial active portion 545 and an extended portion 550. The initial active portion 545 may correspond to a time period during which a UE 120, configured with the second SL DRX cycle 510, is active (e.g., receiving or transmitting information, or monitoring a PSCCH) for each of the active states 540 of the second SL DRX cycle 510. For example, a duration of the initial active portion 545 may be defined by an on duration timer. The extended portion 550 may correspond to a time period during which a UE 120, configured with the second SL DRX cycle 510, is optionally active (e.g., if the active state 540 is extended). For example, the extended portion 550 may correspond to a portion of the first active state 535 that is extended based at least in part on one or more timers (e.g., the inactivity timer or the HARQ retransmission timer). The extended portion 550 of the second SL DRX cycle 510 may be activated during some of the active states of the second SL DRX cycle 510 and may not be activated during other active states of the second SL DRX cycle 510. For example, the first active state 535 may include an extended portion 550 having a duration W (e.g., 20 ms) while the second active state 540 may not have an extended portion 550. Additionally, or alternatively, the extended portion may have different durations for different active states of the second SL DRX cycle 510. For example, the extended portion 550 of the first active state 535 may have duration W (e.g., 20 ms) while the extended portion 550 of the second active state 540 may have a duration V (e.g., 15 ms).

As shown in example 500, an active state of the first SL DRX cycle 505 or the second SL DRX cycle 510 may overlap (e.g., in time and frequency) with an active state of the other of the first SL DRX cycle 505 or the second SL DRX cycle 510. For example, the active state 515 of the first SL DRX cycle 505 may overlap with the active state 535 of the second SL DRX cycle 510. Specifically, the extended portion 530 of the active state 515 of the first SL DRX cycle 505 may overlap with the initial active portion 545 of the active state 535 of the second SL DRX cycle 510.

In a first example, the first SL DRX cycle 505 may be associated with a first UE 120, and the second SL DRX cycle 510 may be associated with a second UE 120. In some cases, the overlap between the active state 515 of the first SL DRX cycle 505 and the active state 535 of the second SL DRX cycle 510 may be based at least in part on the first UE 120 not receiving one or more scheduling SCIs transmitted by the second UE 120 (e.g., not at a receiving state to monitor the scheduling SCIs). For example, the second UE 120 may reserve one or more resources of a communication channel (e.g., a PSSCH) during initial active portion 545, and may broadcast an indication of this reservation to the first UE 120 and other UEs in a proximity (e.g., using the PSCCH). However, the first UE 120, having not received the indication of the reservation, may extend the active state of the first SL DRX cycle 505 to include the extended portion 530. The second UE 120 may attempt to transmit a communication using one or more resources of the PSSCH during the initial active portion 545. However, the initial active portion 545 may overlap with the extended portion 530, during which the first UE 120 may attempt to transmit a communication using the same resources of the PSSCH. Therefore, at least one of the communication by the first UE 120 or the communication by the second UE 120 may not be effectively transmitted due to resource collisions.

In a second example, the first SL DRX cycle 505 and the second SL DRX cycle 510 may both be associated with the first UE 120. In some cases, the first SL DRX cycle 505 may be associated with a first communication of a service (e.g., unicast, groupcast, or broadcast) of the first UE 120, and the second SL DRX cycle 510 may be associated with a second communication of another service of the first UE that is different from the first communication. In this example, the first UE 120 may be in a transmitting state of a first communication mode during the extended portion 530 of the active state 515, and may be in a receiving state of a second communication mode during the initial active portion 545 of the active state 535. However, the extended portion 530 of the active state 515 may overlap with the initial active portion 545 of the active state 535. Thus, the first UE 120 may need to drop at least one of the transmission state of the first communication, or the receiving state of the second communication. Therefore, communications may not be effectively transmitted or received by the first UE 120 due to resource collisions.

Techniques and apparatuses described herein may enable a UE to adjust or terminate an active state of a DRX cycle. For example, the first UE 120 may adjust or terminate an active state of the DRX cycle to remove an overlap between the active state of the DRX cycle and an active state of another DRX cycle.

In some aspects, the first UE 120 may identify an active state of a first SL DRX cycle of the first UE 120 and an active state of a second SL DRX cycle of a second UE 120. The first UE 120 may transmit, to the second UE 120, an indication associated with adjusting the first SL DRX cycle or the second SL DRX cycle. The indication may be based at least in part on the overlap between the active state of the first SL DRX cycle and the active state of the second SL DRX cycle. In some aspects, the indication may indicate an adjustment, by the first UE 120, of the first SL DRX cycle, such that the active state of the first SL DRX cycle no longer overlaps with the active state of the second SL DRX cycle. In some aspects, the indication may include an instruction for the second UE 120 to adjust the second SL DRX cycle such that the active state of the first SL DRX cycle no longer overlaps with the active state of the second SL DRX cycle. In some aspects, the first UE 120 may determine the adjustment to the active state of the first SL DRX cycle or the active state of the second SL DRX cycle based at least in part on a priority of information indicated in the SCI associated to the second SL DRX cycle.

As described above, in the first example, at least one of the transmission by the first UE 120 or the transmission by the second UE 120 may not be effectively transmitted due to resource collisions. For example, at least one of a transmission by the first UE 120 or a transmission by the second UE 120 may not be effectively transmitted as a result of the first UE 120 and the second UE 120 attempting to transmit at the same time and using the overlapped or partially overlapped frequency resources of the PSSCH. Enabling the first UE 120 to adjust a portion (e.g., an extended portion) of the active state of the first SL DRX cycle, or to transmit an instruction to the second UE 120 to adjust a portion of the second SL DRX cycle, may improve communications between the first UE 120 and the second UE 120. For example, adjusting at least one of the first SL DRX cycle or the second SL DRX cycle may remove the overlap between the active states of the SL DRX cycles, and may therefore reduce or eliminate the resource collisions.

In some aspects, the first UE 120 may identify that an active state of a first SL DRX cycle of the first UE overlaps with an active state of a second SL DRX cycle of the first UE. In some aspects, the first UE 120 may terminate an extended portion of the active state of the first SL DRX cycle, such that the active state of the first SL DRX cycle no longer overlaps with the active state of the second SL DRX cycle, and may transmit an indication of this termination to the second UE 120. In some aspects, the first UE 120 may selectively terminate the active state of the first SL DRX cycle based at least in part on one or more traffic characteristics or QoS requirements of the first SL DRX cycle, such as a type of information, a priority of information, a latency requirement of information, or an amount of information in the first SL DRX cycle, as compared to one or more characteristics of the second SL DRX cycle.

As described above, in the second example, the first UE 120 may need to drop a transmission state of a first SL DRX cycle or a receiving state of a second SL DRX cycle due to resource collisions. Therefore, communications may not be effectively transmitted or received by the first UE 120. Enabling the first UE 120 to terminate an active state of the first SL DRX cycle may improve a quality of communications by the first UE 120. For example, the active state of the first SL DRX cycle may be selectively terminated (e.g., based at least in part on the one or more traffic characteristics or QoS requirements of the first SL DRX cycle) to remove the overlap between the active state of the first SL DRX cycle and the active state of the second SL DRX cycle. Therefore, the first UE 120 may reduce resource collisions between the multiple communications (e.g., unicast, groupcast, or broadcast) using the different SL DRX cycles of the first UE 120.

As indicated above, FIG. 5 is provided as an example. Other examples may differ from what is described with regard to FIG. 5.

Figure 6:
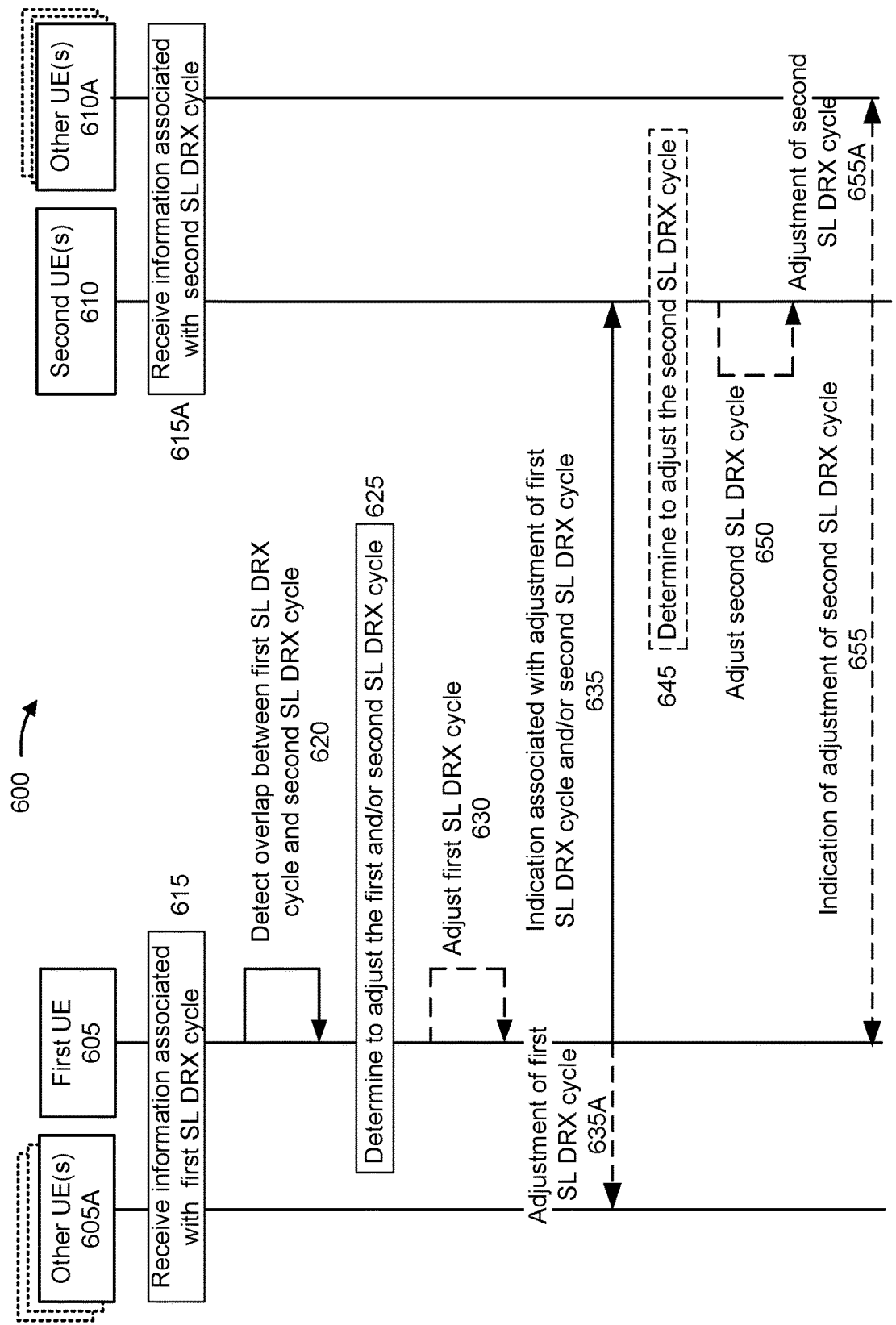
FIG. 6 is a diagram illustrating a first example of cooperative operation with SL DRX, in accordance with the present disclosure.

FIG. 6 is a diagram illustrating an example 600 of cooperative operation with SL DRX, in accordance with the present disclosure. As shown in FIG. 6, in some aspects, a first UE 605 may communicate with one or more other UEs 605A (e.g., using a first SL DRX) and a second UE 610 may communicate with one or more other UEs 610A (e.g., using a second SL DRX). The first UE 605 and the second UE 610 may include some or all of the features of the UE 120 described herein. In some aspects, the first UE 605 and/or the second UE 610 may be configured (e.g., pre-configured or RRC configured) with information relating to one or more SL DRX cycles.

As shown in connection with reference numbers 615 and 615A, the first UE 605 and the other UE(s) 605A, and/or the second UE 610 and other UE(s) 610A, may receive information associated with a first SL DRX configuration and/or a second SL DRX configuration, respectively (e.g., receiving pre-configuration or configuration message or receiving indication from higher layer). The first SL DRX cycle may be associated with the first UE 605 for a first communication with one or more other UEs, and the second SL DRX cycle may be associated with the second UE 610 for a second communication with one or more other UEs. In some aspects, the first UE 605 may identify the active state of the second SL DRX cycle based at least in part on performing one or more measurements, or receiving one or more communications, within the active state, or outside of the active state, of the first SL DRX. Additional details regarding identifying the information associated with a UE determining a SL DRX cycle of another UE are described below in connection with FIG. 8.

As shown in connection with reference number 620, the first UE 605 may detect an overlap between the first SL DRX cycle and the second SL DRX cycle. For example, the first UE 605 may detect an overlap between the active state of the first SL DRX cycle and the active state of the second SL DRX cycle. In some aspects, the overlap between the first SL DRX cycle and the second SL DRX cycle may be an overlap between the active state of the second SL DRX cycle and an extended portion of the active state of the first SL DRX cycle. As shown in the example of FIG. 5, the initial active portion 545 of the active state 535 of the second SL DRX cycle 510 may overlap with the extended portion 530 of the active state 515 of the first SL DRX cycle 505. As described above, the overlap between the first SL DRX cycle and the second SL DRX cycle may cause errors in communication due to resource collisions. For example, both the first UE 605 (using the active state of the first SL DRX cycle) and the second UE 610 (using the active state of the second SL DRX cycle) may attempt to communicate using the same time and frequency resources for PSSCH transmissions.

As shown in connection with reference number 625, in some aspects, the first UE 605 may determine whether the active state of the first SL DRX can be adjusted, or should be adjusted, to remove the overlap. For example, the first UE 605 may determine whether the active state of the first SL DRX cycle can be adjusted, or should be adjusted, based at least in part on a type of information, a priority of information, a latency requirement of information, or an amount of information, among other examples, being transmitted in the active state of the first SL DRX cycle. In some aspects, if the priority is equal to or above a threshold, or associated with a particular priority class or QoS class, then the first SL DRX cycle may not be able to be adjusted. Alternatively, if the priority is below a threshold, or associated with a particular priority class or QoS class, then the first SL DRX cycle may be able to be adjusted. In some aspects, if a latency requirement is equal to or less than a threshold, then the first SL DRX cycle may not be able to be adjusted. Alternatively, if the latency requirement is greater than the threshold, then the first SL DRX cycle may be adjusted. In some aspects, if an amount of information is equal to or greater than a threshold, then the first SL DRX cycle may not be able to be adjusted. Alternatively, if the amount of information is less than the threshold, then the first SL DRX cycle may be adjusted. In some aspects, if a first type of information (e.g., lower priority data) is being transmitted, then the first SL DRX cycle may be able to be adjusted. Alternatively, if a second type of information (e.g., a PC5 RRC control message or PC5 NAC CE control signaling) is being transmitted, then the first SL DRX cycle may not be able to be adjusted.

In some aspects, the first UE 605 may determine to adjust the active state of the first SL DRX cycle based at least in part on a QoS comparison (e.g., based at least in part on priorities for the communication using first SL DRX cycle and the communication using second SL DRX cycle) between communications transmitted during the active state of the first SL DRX cycle and communications transmitted during the active state of the second SL DRX cycle. The first UE 605 may adjust the active state of the first SL DRX cycle based at least in part on determining that the active state of the first SL DRX cycle can (and should) be adjusted (e.g., if the priority for the communication using first SL DRX cycle is lower than the priority indicated in the scheduling SCI for the communication using second SL DRX cycle). Alternatively, the first UE 605 may transmit an indication for the second UE 610 to adjust the active state of the second SL DRX cycle (e.g., if the priority for the communication using first SL DRX cycle is higher than the priority indicated in the scheduling SCI for the communication using second SL DRX cycle), as described in detail below, based at least in part on determining that the active state of the first SL DRX cycle cannot (or should not) be adjusted.

In some aspects, adjusting the active state of the first SL DRX cycle may include adjusting an extended portion of the active state of the first SL DRX cycle. For example, adjusting the active state of the first SL DRX cycle may include adjusting a duration of the extended portion of the active state of the first SL DRX cycle to a shorter duration (e.g., from 10 ms to 5 ms). Alternatively, adjusting the active state of the first SL DRX cycle may include removing or terminating the extended portion of the active state of the first SL DRX cycle (e.g., so that the UE enters an inactive state after the initial active portion).

In some aspects, the active state of the first SL DRX cycle may be based at least in part on one or more timers, such as an on duration timer, an inactivity timer, a HARQ RTT, or a HARQ retransmission timer, among other examples. In this example, adjusting the active state of the first SL DRX cycle may include adjusting one or more of the timers to remove the overlap with the active state of the second SL DRX cycle.

As described above, the first UE 605 may adjust one or more time extensions (e.g., shorten the running duration of the one or more timers or stop or deactivate one or more timers) of the active state of the first SL DRX cycle to remove the overlap with the active state of the second SL DRX cycle. Additionally, or alternatively, the first UE 605 may adjust one or more frequency resources of the active state of the first SL DRX cycle to remove the overlap in frequency with the active state of the second SL DRX cycle. For example, adjusting the active state of the first SL DRX cycle may include switching to a resource pool or a frequency range that does not include one or more overlapping frequency resources of the active state of the second SL DRX cycle (e.g., which may be sensed and/or measured as described below in connection with FIG. 8). The first UE 605 may determine whether to adjust the time extensions and/or the frequency resources of the active state of the first SL DRX cycle based at least in part on one or more characteristics of the communication channel (e.g., the PSSCH). For example, the first UE 605 may adjust the duration (e.g., in time) of the active state of the first SL DRX cycle based at least in part on determining that a communication in the active state of the first SL DRX cycle cannot be communicated in a different frequency resource of the PSSCH.

As shown in connection with reference number 630, the first UE 605 may adjust the first SL DRX. The first UE 605 may adjust the first SL DRX based at least in part on identifying the overlap between the first SL DRX active state and the second SL DRX active state. In some aspects, the active state of the first SL DRX cycle may be adjusted to remove the overlap with the active state of the second SL DRX cycle. In some aspects, first UE 605 may determine to adjust both the active state of the first SL DRX and the active state of the second SL DRX, as described above.

As shown in connection with reference number 635, the first UE 605 may transmit, and the second UE 610 may receive, an indication associated with an adjustment of the first SL DRX cycle and/or the second SL DRX cycle. The indication may be transmitted using a sidelink communication (e.g., using a PC5 RRC message or a PC5 MAC CE), among other examples. In some aspects, the first UE 605 may transmit, to the second UE 610, an indication indicating that the active state of the first SL DRX cycle has been adjusted. The first UE 605 may transmit the indication that the active state of the first SL DRX cycle has been adjusted based at least in part on adjusting the active state (e.g., the extended portion of the active state) of the first SL DRX cycle to remove the overlap with the active state of the second SL DRX cycle.

In some aspects, the indication may include an instruction for the second UE to adjust the second SL DRX cycle. As described above, the first UE 605 may transmit the instruction based at least in part on determining that the first SL DRX cycle cannot be adjusted, or should not be adjusted, based at least in part on the information being communicated in the active state of the first SL DRX cycle. In some aspects, the instruction to the second UE 610 may be an instruction for the second UE 610 to adjust one or more timers associated with the second SL DRX cycle. As described above, the one or more timers may include an on duration timer, an inactivity timer, a HARQ RTT, or a HARQ retransmission timer, among other examples, associated with the active state of the second SL DRX cycle. In some aspects, the instruction for the second UE may include an instruction to delay the active state of the second SL DRX cycle. For example, the instruction may indicate to delay a start time of the active state of the second SL DRX cycle, based at least in part on the one or more timers.

In some aspects, the first UE 605 may adjust the active state of the first SL DRX cycle, and may transmit an indication to the second UE 610 that the active state of the first SL DRX cycle has been adjusted to remove the overlap with the active state of the second SL DRX cycle. In some aspects, the first UE 605 may not adjust the active state of the first SL DRX cycle, and may transmit an indication to the second UE 610 to adjust the active state of the second SL DRX cycle to remove the overlap with the active state of the first SL DRX cycle. In some aspects, both the first SL DRX cycle and the second SL DRX cycle may be adjusted to remove the overlap between the first SL DRX cycle and the second SL DRX cycle. For example, the first UE 605 may determine that the first SL DRX cycle may be adjusted (e.g., using one or more techniques described above) to partially remove the overlap between the first SL DRX cycle and the second SL DRX cycle. However, the first UE 605 may determine that the second SL DRX cycle may need to be adjusted (e.g., using one or more techniques described above) to completely remove the overlap between the first SL DRX cycle and the second SL DRX cycle. In this example, the first UE 605 may adjust the active state of the first SL DRX cycle, and may transmit an indication to the second UE 610 to adjust the active state of the second SL DRX cycle to completely remove the overlap between the first SL DRX cycle and the second SL DRX cycle.

As shown in connection with reference number 635A, the first UE 605 may transmit, and the other UE(s) 605A may receive, an indication associated with an adjustment of the first SL DRX cycle. The indication may be transmitted using a sidelink communication (e.g., using a PC5 RRC message or a PC5 MAC CE, among other examples). In some aspects, the first UE 605 may transmit, to the other UE(s) 605A, an indication indicating that the active state of the first SL DRX cycle has been adjusted. The first UE 605 may transmit the indication that the active state of the first SL DRX cycle has been adjusted based at least in part on adjusting the active state (e.g., the extended portion of the active state) of the first SL DRX cycle to remove the overlap with the active state of the second SL DRX cycle. The other UE(s) 605A may adjust the active state of the first SL DRX cycle based at least in part on the indication.

As shown in connection with reference number 645, the second UE 610 may determine whether the active state of the second SL DRX can be adjusted or delayed based on the indication. For example, the second UE 610 may determine whether the active state of the second SL DRX cycle can be adjusted or delayed based at least in part on a type of information, a priority of information, a latency requirement of information, or an amount of information, among other examples, being transmitted in the active state of the second SL DRX cycle. In some aspects, if the priority is equal to or above a threshold, or associated with a particular priority class or QoS class, the second SL DRX cycle may not be able to be adjusted or delayed. Alternatively, if the priority is below a threshold, or associated with a particular priority class or QoS class, the second SL DRX cycle may be able to be adjusted or delayed. In some aspects, if a latency requirement is equal to or less than a threshold, the second SL DRX cycle may not be able to be adjusted or delayed. Alternatively, if the latency requirement is greater than the threshold, the second SL DRX cycle may be adjusted or delayed. In some aspects, if an amount of information is equal to or greater than a threshold, the second SL DRX cycle may not be able to be adjusted or delayed. Alternatively, if the amount of information is less than the threshold, the second SL DRX cycle may be adjusted or delayed. In some aspects, if a first type of information (e.g., lower priority data) is being transmitted, the second SL DRX cycle may be able to be adjusted or delayed. Alternatively, if a second type of information (e.g., a PC5 RRC control message or PC5 NAC CE control signaling) is being transmitted, the second SL DRX cycle may not be able to be adjusted or delayed.

As shown in connection with reference number 650, the second UE 610 may adjust or delay the second SL DRX cycle. The second UE 610 may adjust or delay the second SL DRX cycle based at least in part on receiving the indication from the first UE 605 to adjust or delay the second SL DRX cycle. For example, the second UE 610 may adjust the starting point of the active state of the second SL DRX cycle to remove the overlap with the active state of the first SL DRX cycle using one or more techniques described above. In some aspects, the indication received from the first UE 605 may include an indication of one or more particular resources (e.g., an indication of overlapping resources, such as time and/or frequency resources) that the second UE 610 should adjust to remove the overlap between the first SL DRX cycle and the second SL DRX cycle. In some aspects, the indication received from the first UE 605 may not include an indication of one or more particular resources to be adjusted. Therefore, the second UE 610 may determine (e.g., based at least in part on one or more measurements) which of the resources should be adjusted (e.g., which of the resources are overlapping resources) to remove the overlap between the first SL DRX cycle and the second SL DRX cycle.

As shown in connection with reference number 655, the second UE 610 may transmit, and the first UE 605 may receive, an indication associated with an adjustment of the second SL DRX cycle. For example, the second UE 610 may transmit, to the first UE 605, an indication that the second UE has adjusted the second SL DRX cycle. The indication may indicate whether the active state of the second SL DRX cycle has been adjusted to remove the overlap with the first SL DRX cycle. In some aspects, the indication may indicate the particular resources (e.g., time and/or frequency resources) of the second SL DRX cycle that were adjusted to remove the overlap with the first SL DRX cycle.

As shown in connection with reference number 655A, the second UE 610 may transmit, and the other UE(s) 610A may receive, an indication associated with an adjustment of the second SL DRX cycle. For example, the second UE 610 may transmit, to the other UE(s) 610A, an indication that the second UE has adjusted the second SL DRX cycle. The indication may indicate whether the active state of the second SL DRX cycle has been adjusted to remove the overlap with the first SL DRX cycle. In some aspects, the indication may indicate the particular resources (e.g., time and/or frequency resources) of the second SL DRX cycle that were adjusted to remove the overlap with the first SL DRX cycle.

As described above, at least one of a transmission by the first UE 605 or a transmission by the second UE 610 may not be effectively transmitted due to resource collisions. For example, at least one of the transmission by the first UE 605 or the transmission by the second UE 610 may not be effectively transmitted as a result of the first UE 605 and the second UE 610 attempting to transmit at the same time and using the same frequency resources of the PSSCH. Enabling the first UE 120 to adjust a portion (e.g., an extended portion) of the active state of the first SL DRX cycle, or to transmit an instruction to the second UE 120 to adjust a portion of the second SL DRX cycle, may improve a quality of communications between the first UE 120 and the second UE 120. For example, adjusting at least one of the first SL DRX cycle or the second SL DRX cycle may remove the overlap between the active states of the SL DRX cycles, and may therefore reduce or eliminate resource collisions.

As indicated above, FIG. 6 is provided as an example. Other examples may differ from what is described with regard to FIG. 6.

Figure 7:
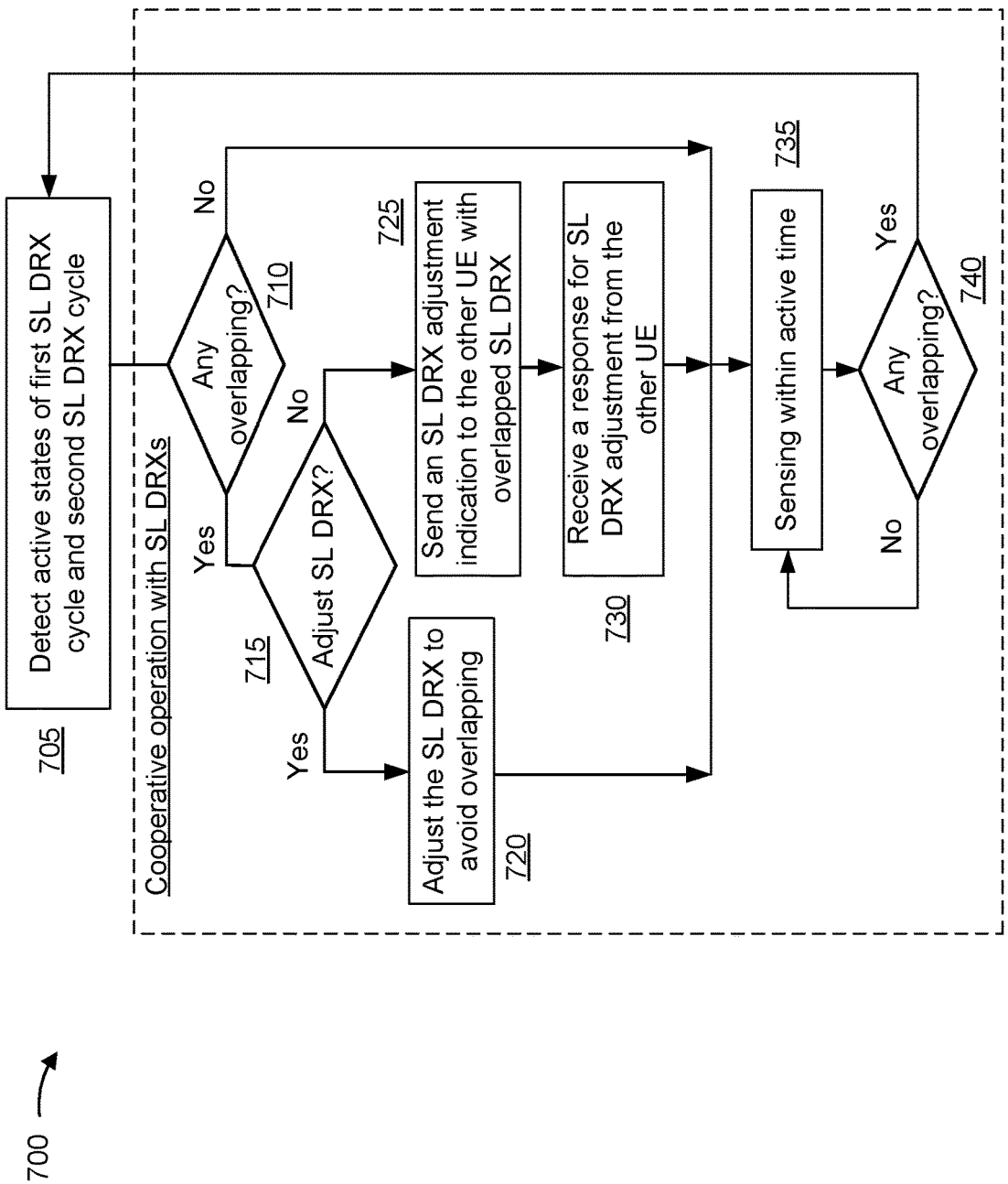
FIG. 7 is a diagram illustrating an example associated with SL DRX adjustment, in accordance with the present disclosure.

FIG. 7 is a diagram illustrating an example 700 of SL DRX adjustment, in accordance with the present disclosure. The steps illustrated in the example 700 may be performed by a UE, such as the UE 605.

As shown in connection with reference number 705, the UE 605 may detect (e.g., identify) one or more active states of a first SL DRX cycle and one or more active states of a second SL DRX cycle. For example, the UE 605 may detect the active state of the first SL DRX cycle and the active state of the second SL DRX cycle shown in FIG. 6. The first SL DRX cycle may be associated with the UE 605, and the second SL DRX cycle may be associated with the UE 610. In some aspects, the UE 605 may detect the active state of the first SL DRX cycle and the active state of the second SL DRX cycle based at least in part on performing one or more SL RSRP measurements, or based at least in part on decoding one or more scheduling SCIs, as described below in connection with FIG. 8.

As shown in connection with reference number 710, the UE 605 may determine whether there is any overlapping between the first SL DRX cycle and the second SL DRX cycle. For example, the UE 605 may determine whether the active state of the first SL DRX cycle overlaps with the active state of the second SL DRX cycle. If the active state of the first SL DRX cycle overlaps with the active state of the second SL DRX cycle, then the UE 605 may proceed to step 715. If the active state of the first SL DRX cycle does not overlap with the active state of the second SL DRX cycle, then the UE 605 may proceed to step 735.

As shown in connection with reference number 715, the UE 605 may determine whether to adjust the first SL DRX cycle. In some aspects, the UE 605 may determine whether to adjust an extended portion of the active state of the first SL DRX cycle. The UE 605 may determine to adjust the active state of the first SL DRX cycle based at least in part on a type of information, a priority of information, a latency requirement of information, or an amount of information, among other examples, being transmitted in the active state of the first SL DRX cycle. If the UE 605 determines to adjust the active state of the first SL DRX cycle, then the UE 605 may proceed to step 720. If the UE 605 determines not to adjust the active state of the first SL DRX cycle, then the UE 605 may proceed to step 725.

As shown in connection with reference number 720, the UE 605 may adjust the active state of the first SL DRX cycle based at least in part on determining to adjust the active state of the first SL DRX cycle. In some aspects, adjusting the active state of the first DRX cycle may include adjusting the extended portion of the active state of the first SL DRX cycle. The UE 605 may adjust the active state of the first SL DRX cycle to remove the overlap with the active state of the second SL DRX cycle. In some aspects, adjusting the active state of the first SL DRX cycle may include adjusting one or more time resources (e.g., adjusting a duration, such as by adjusting one or more timers) or one or more frequency resources (e.g., switching a resource pool or frequency range) during the active state of the first SL DRX cycle. After adjusting the active state of the first SL DRX cycle, the UE 605 may proceed to step 735.

As shown in connection with reference number 725, the UE 605 may send an SL DRX adjustment indication to the UE 610 with the overlapped SL DRX. For example, the UE 605 may transmit an indication (e.g., an instruction) to the UE 610 to adjust the active state of the second SL DRX cycle associated with the UE 610. The UE 605 may transmit the indication to adjust the active state of the second SL DRX cycle based at least in part on determining (e.g., at step 715) not to adjust the active state of the first SL DRX cycle. After transmitting the indication, the UE 605 may proceed to step 730.

As shown in connection with reference number 730, the UE 605 may receive a response for SL DRX adjustment from the UE 610. For example, the UE 605 may receive, from the UE 610, an indication that the active state of the second SL DRX cycle has been adjusted to remove the overlap with the active state of the first SL DRX cycle. After receiving the indication, the UE 605 may proceed to step 735. Alternately, the UE 605 may receive, from the UE 610, an indication that the active state of the second SL DRX cycle cannot be adjusted to remove the overlap with the active state of the first SL DRX cycle. After receiving the indication, the UE 605 may proceed to step 715 to determine the adjustment to the first SL DRX.

As shown in connection with reference number 735, the UE 605 may perform sensing within the active state of a SL DRX cycle (e.g., the first SL DRX cycle). As described below in connection with FIG. 8, sensing may include performing one or more measurements or receiving one or more communications, among other examples. In some aspects, the sensing may be performed periodically, or may be performed based at least in part on one or more triggers. After performing the sensing within the active state, the UE 605 may proceed to step 740.

As shown in connection with reference number 740, the UE 605 may determine whether there is any overlapping between the first SL DRX cycle and the second SL DRX cycle. For example, the UE 605 may determine whether the active state of the first SL DRX cycle overlaps with the active state of the second SL DRX cycle. If there is no overlapping, the UE may continue to perform sensing within the active state, in accordance with step 735. If there is overlapping, the UE 605 may proceed back to step 705 for further detection or step 715 for determining the adjustment to the first SL DRX cycle or the second SL DRX cycle.

In some aspects, as described above, the first UE 605 may adjust both the active state of the first SL DRX cycle and the active state of the second SL DRX.

As indicated above, FIG. 7 is provided as an example. Other examples may differ from what is described with regard to FIG. 7.

Figure 8:
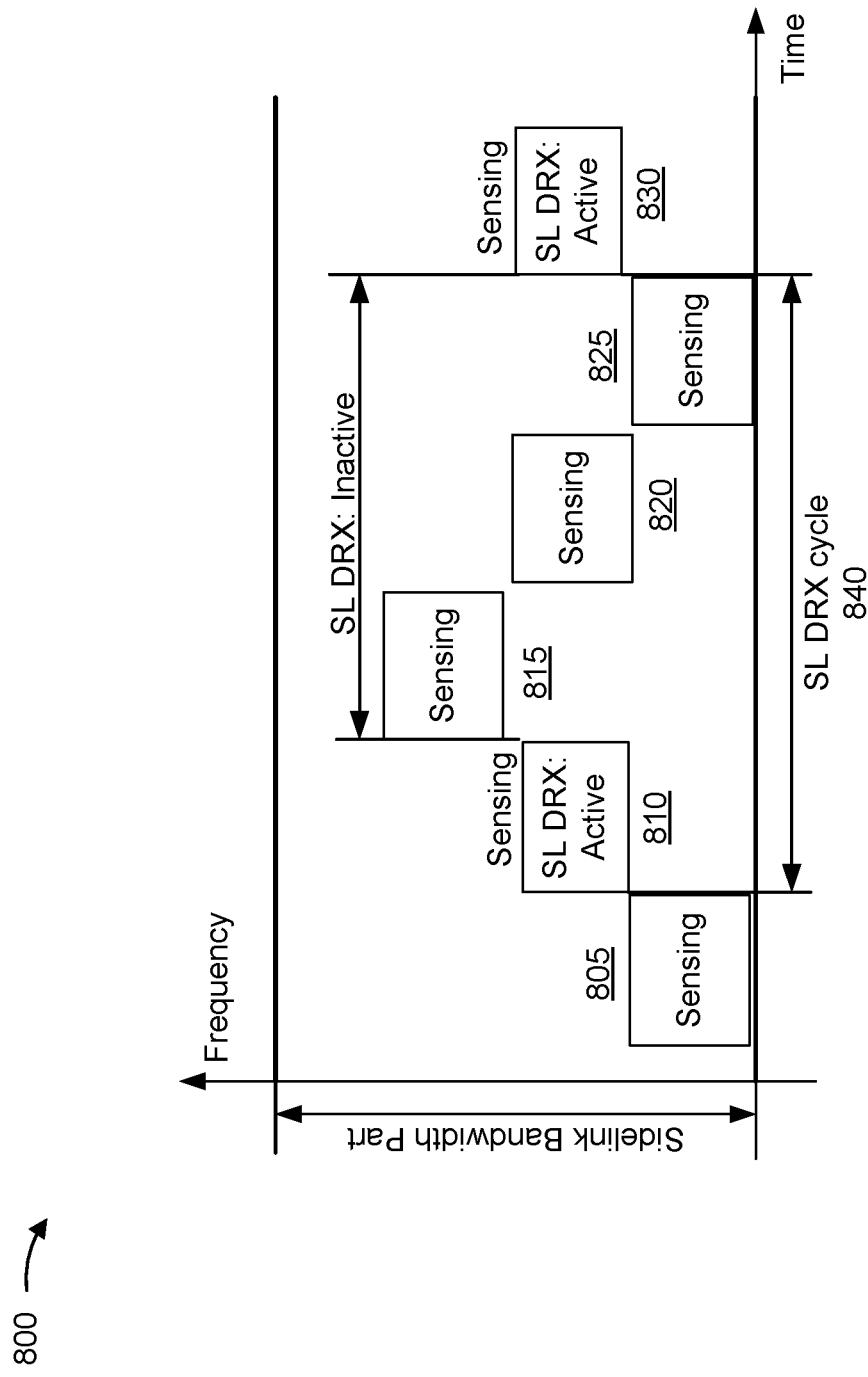
FIG. 8 is a diagram illustrating an example associated with SL DRX sensing, in accordance with the present disclosure.

FIG. 8 is a diagram illustrating an example 800 of SL DRX sensing, in accordance with the present disclosure. The sensing may be performed by a UE, such as the UE 605.

As shown in FIG. 8, the UE 605 may be configured to perform sensing for one or more communications, which may include one or more reference signals. In some aspects, the sensing may include performing one or more measurements or receiving one or more communications. In some aspects, the sensing may be performed periodically. For example, the sensing may be performed in one or more intervals in accordance with a configuration, such as the SL DRX configuration or a sensing configuration. In some aspects, the sensing may be based at least in part on one or more triggers. For example, the sensing may be triggered (e.g., activated) based at least in part on an SL RSRP (e.g., PSCCH-RSRP or PSSCH-RSRP) or RSSI or CBR measurement being above a threshold. In some aspects, the sensing may be based at least in part on decoding scheduling SCIs received from other UEs, such as the UE 610. The scheduling SCIs may be indicated or transmitted by the other UE(s) for communications associated with different services with other SL DRX cycles respectively within the active state of the SL DRX cycle 840 (e.g., the first SL DRX in FIG. 6). In some aspects, the SCI may schedule communication(s) of the second UE 610 in some time resources using the second SL DRX cycle, which would indicate that the second SL DRX cycle is active in those time resources. If those time resources are also included in the active state of the first SL DRX cycle, then there is an overlap.

In some aspects, the sensing may be performed within the active state of the SL DRX cycle, such as during the time periods corresponding to reference numbers 810 and 830. For example, the sensing may be performed during a time that the UE 605 is communicating using the SL DRX cycle 840. In some aspects, the sensing may be performed within the active state of the SL DRX cycle 840 based at least in part on one or more resources being reserved by other UEs for communications associated with a communication mode that is different than the communication mode that is currently being used by the UE 605.

In some aspects, the sensing may be performed outside of the active state of the SL DRX cycle 840, such as during the time periods corresponding to reference numbers 805, 815, 820, and 825. The sensing may be performed based at least in part on sliding a sensing window across a frequency range of a component carrier or across a frequency range of multiple transmitting resource pools, or randomly sensing across the frequency range of the component carrier or across the frequency range of the multiple transmitting resource pools. In some aspects, the sensing may be performed outside of the active state of the SL DRX cycle 840 based at least in part on one or more resources being reserved by other UEs (e.g., indicated by the scheduling SCI from other UEs) for communications that are different than the communication that is being used in the active state of the first SL DRX cycle (e.g., SL DRX cycle 840).

In some aspects, sensing may be used by the first UE to detect an active state of a SL DRX cycle configured for the second UE, without the first UE being directly notified of the SL DRX cycle configured for the second UE (e.g., because it would require a lot of signaling overhead to be notified of the SL DRX cycle of all of the UEs that are within communication proximity of the UE).

As indicated above, FIG. 8 is provided as an example. Other examples may differ from what is described with regard to FIG. 8.

Figure 9:
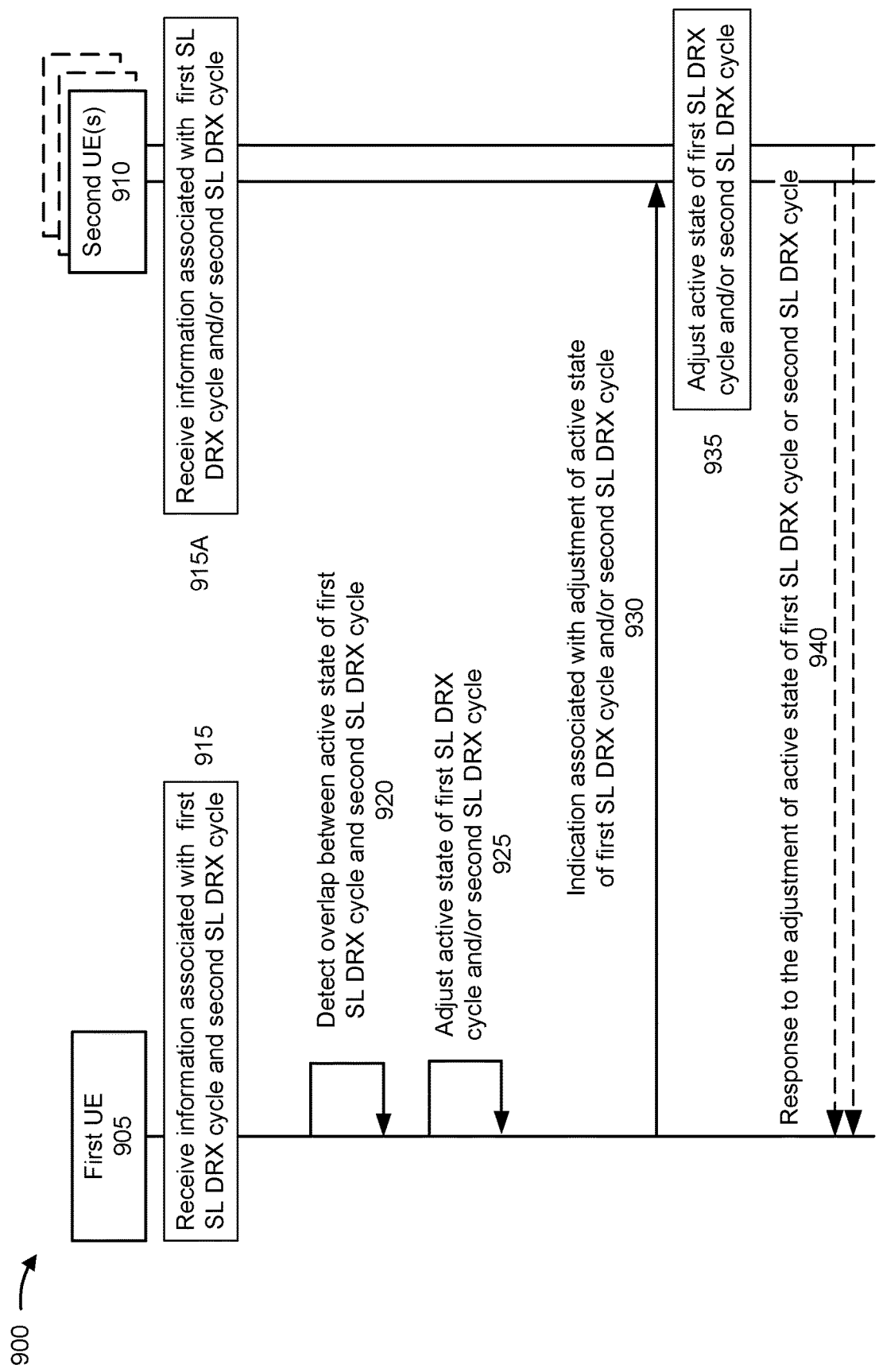
FIG. 9 is a diagram illustrating a second example associated with cooperative operation with SL DRX, in accordance with the present disclosure.

FIG. 9 is a diagram illustrating an example 900 of cooperative operation with SL DRX, in accordance with the present disclosure. As shown in FIG. 9, a first UE 905 may communicate with a second UE(s) 910 (e.g., a second UE 910 for a unicast or second UEs 910 for a groupcast or broadcast). The first UE 905 and the second UE(s) 910 may include some or all of the features of the UE 120 described herein. In some aspects, the first UE 905 and/or the second UE(s) 910 may be configured (e.g., pre-configured or RRC configured) with information relating to one or more SL DRX cycles (e.g., a first SL DRX and a second SL DRX).

As shown in connection with reference numbers 915 and 915A, the first UE 905 and/or the second UE(s) 910 may receive information (e.g., configuration or pre-configuration information, and/or information from a higher layer) associated with a first SL DRX configuration and a second SL DRX configuration. The first SL DRX cycle and the second SL DRX cycle may be associated with the first UE 905. For example, the first SL DRX cycle may correspond to a first communication (e.g., unicast, groupcast, or broadcast) of the first UE 905 and the second SL DRX cycle may correspond to a second communication of the first UE 905 that is different from the first communication mode.

As shown in connection with reference number 920, the first UE 905 may detect an overlap between the first SL DRX cycle and the second SL DRX cycle. For example, the first UE 905 may detect an overlap between the active state of the first SL DRX cycle and the active state of the second SL DRX cycle. In some aspects, the overlap between the first SL DRX cycle and the second SL DRX cycle may be an overlap between the active state of the second SL DRX cycle and an extended portion of the active state of the first SL DRX cycle. As shown in the example of FIG. 5, the initial active portion 545 of the active state 535 of the second SL DRX cycle 510 may overlap with the extended portion 530 of the active state 515 of the first SL DRX cycle 505. As described above, the overlap between the first SL DRX cycle and the second SL DRX cycle may cause a first communication during the active state of the first SL DRX cycle or a second communication during the active state of the second SL DRX cycle to be interrupted due to resource collisions.

As shown in connection with reference number 925, the first UE 905 may adjust the active state of the first SL DRX cycle and/or the second SL DRX cycle. The first UE 905 may adjust the active state of the first SL DRX cycle and/or the active state of the second SL DRX cycle based at least in part on identifying the overlap between the first SL DRX cycle and the second SL DRX cycle.

In some aspects, adjusting the active state of the first SL DRX cycle may include terminating an extended portion of the active state of the first SL DRX cycle. Terminating the extended portion of the active state of the first SL DRX cycle may include terminating the extended portion (e.g., terminating some or all of the extended portion) of the active state of the first SL DRX cycle. In some aspects, the active state of the first SL DRX cycle may be based at least in part on one or more timers, such as an on duration timer, an inactivity timer, a HARQ RTT, or a HARQ retransmission timer, among other examples. In this example, terminating the extended portion of the active state of the first SL DRX cycle may include terminating one or more of the timers (e.g., stopping the one or more timers or setting the one or more timers to be expired) to remove the overlap with the active state of the second SL DRX cycle.

In some aspects, adjusting the active state of the second SL DRX cycle may include delaying the start of active state of the second SL DRX cycle. For example, the first UE 905 may adjust a start time of the active state of the second SL DRX cycle (e.g., adjusting the SL DRX offset) in order to remove the overlap with the active state of the first SL DRX cycle. In some aspects, the active state of the second SL DRX cycle may be adjusted based at least in part on delaying the one or more timers, such as an on duration timer, an inactivity timer, a HARQ RTT, or a HARQ retransmission timer, among other examples.

In some aspects, the first UE 905 may determine whether the active state of the first SL DRX can be terminated, or should be terminated, to remove the overlap. For example, the first UE 905 may determine whether the active state of the first SL DRX cycle can be terminated, or should be terminated, based at least in part on a type of information, a priority of information, a latency requirement of information, or an amount of information, among other examples, being transmitted in the active state of the first SL DRX cycle, in a similar manner as described above in connection with FIG. 6. For example, the first UE 905 may determine to adjust the active state of the first SL DRX cycle based at least in part on a QoS comparison (e.g., based at least in part on priority, reliability, packet delay budget (PDB), data volume or data rate, and/or latency, among other examples) between the active state of the first SL DRX cycle and the active state of the second SL DRX cycle, in a similar manner as described above in connection with FIG. 6.

In some aspects, based at least in part on determining that the active state (e.g., the extended portion) of the first SL DRX cycle can be adjusted, the first UE 905 may adjust (e.g., terminate) the active state of the first SL DRX cycle. In some aspects, based at least in part on determining that the active state (e.g., the extended portion) of the first SL DRX cycle cannot be adjusted, the first UE 905 may adjust (e.g., delay) the active state of the second SL DRX cycle.

In some aspects, based at least in part on determining that the active state of the second SL DRX cycle can be adjusted, the first UE 905 may adjust (e.g., delay) the active state of the second SL DRX cycle. In some aspects, based at least in part on determining that the active state of the second SL DRX cycle cannot be adjusted, the first UE 905 may adjust (e.g., terminate) the active state (e.g., the extended portion) of the first SL DRX cycle.

As shown in connection with reference number 930, the first UE 905 may transmit, and the second UE(s) 910 may receive, an indication associated with the adjustment of the extended portion of the first SL DRX cycle and/or the adjustment of the active state of the second SL DRX cycle. In some aspects, the first UE 905 may transmit an indication that the active state of the first SL DRX cycle has been terminated based at least in part on terminating the active state of the first SL DRX cycle. In some aspects, the first UE 905 may transmit an indication that the active state of the second SL DRX cycle has been delayed based at least in part on delaying the active state of the second SL DRX cycle.

In some aspects, the indication associated with the adjustment of the first SL DRX cycle may include an indication to the second UE(s) 910 indicating not to communicate with the first UE 905 during the extended portion of the first SL DRX cycle (e.g., because the first UE 905 has terminated the extended portion and will not transmit or receive during the extended portion). For example, the indication may instruct the second UE(s) 910 not to use one or more time and frequency resources of the PSSCH corresponding to the extended portion of the first SL DRX cycle. The indication may be transmitted based at least in part on the first UE 905 determining that the one or more resources of the PSSCH are being used by one or more UEs. The indication may be transmitted using a sidelink communication (e.g., a PC5 RRC message or a PC5 medium access control (MAC) control element (CE) (MAC-CE)). The second UE(s) 910 may adjust the first SL DRX cycle and/or the second SL DRX cycle based at least in part on the indication (e.g., the indication shown in connection with reference number 935), and may transmit, to the first UE 905, an indication of whether the second UE(s) 910 have adjusted the active state of the first SL DRX cycle and/or the active state of the second SL DRX cycle.

As shown in connection with reference number 940, the second UE(s) 910 may transmit, and the first UE 905 may receive, a response associated with the adjustment of the extended portion of the first SL DRX cycle and/or the adjustment of the active state of the second SL DRX cycle.

As described above, enabling the first UE 905 to adjust the active state of the first SL DRX cycle may improve the quality of communications by the first UE 905. For example, the active state of the first SL DRX cycle may be selectively adjusted (e.g., based at least in part on the one or more characteristics of the first SL DRX cycle) to remove the overlap between the active state of the first SL DRX cycle and the active state of the second SL DRX cycle. Therefore, the first UE 905 may reduce resource collisions between the multiple communications (e.g., unicast, groupcast, or broadcast) using the different SL DRX cycles of the first UE 905.

As indicated above, FIG. 9 is provided as an example. Other examples may differ from what is described with regard to FIG. 9.

Figure 10:
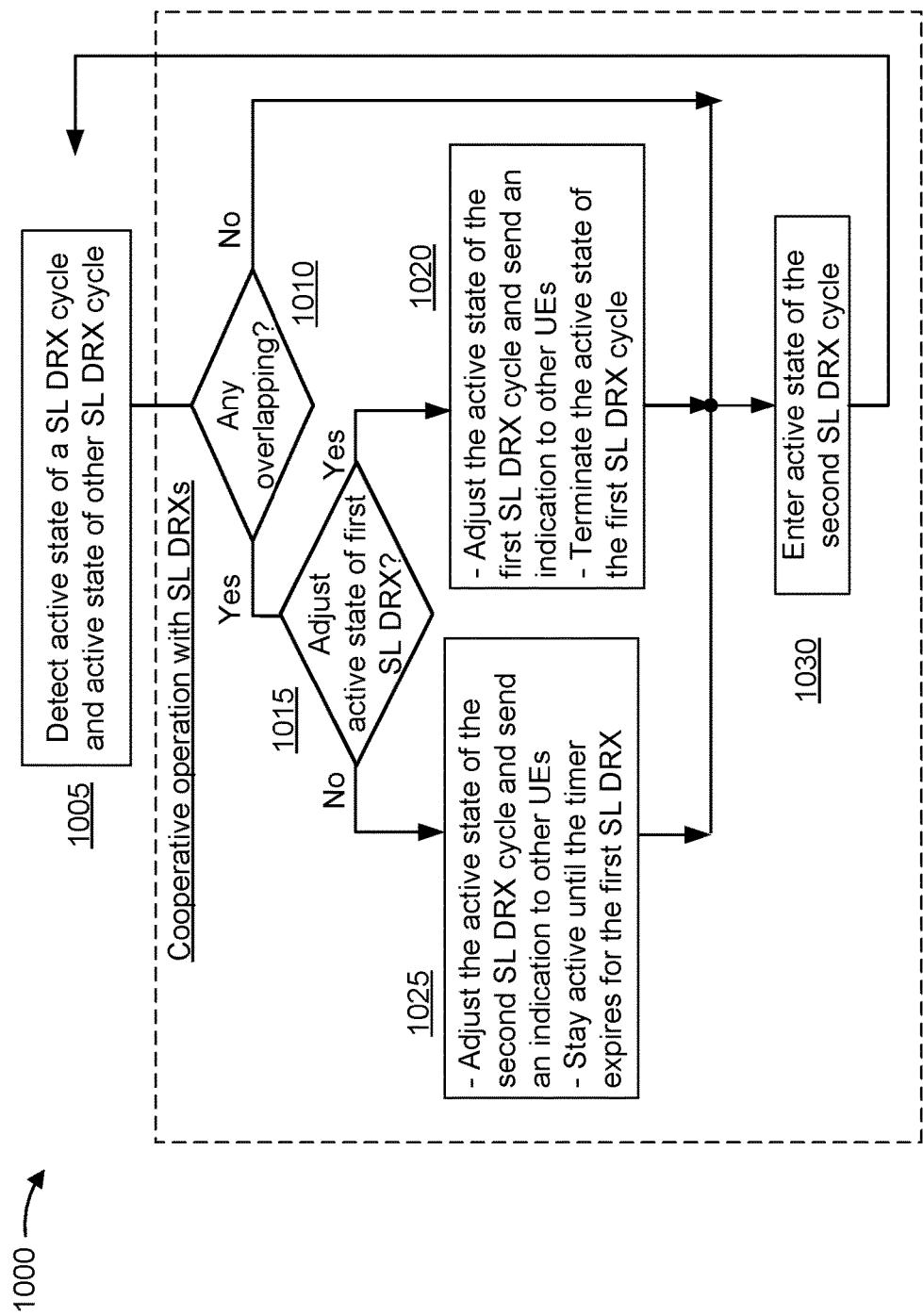
FIG. 10 is a diagram illustrating an example associated with SL DRX termination, in accordance with the present disclosure.

FIG. 10 is a diagram illustrating an example 1000 of SL DRX termination, in accordance with the present disclosure. The steps illustrated in the example 1000 may be performed by a UE, such as the UE 905 in FIG. 9.

As shown in connection with reference number 1005, the UE 905 may detect (e.g., identify) an active state of a SL DRX and an active state of another SL DRX. For example, the UE 905 may detect the active state of the first SL DRX cycle and an active state of a second sidelink DRX cycle. The first SL DRX cycle and the second SL DRX cycle may be associated with the UE 905. For example, the first SL DRX cycle may correspond to a first communication of the first UE 905 and the second SL DRX cycle may correspond to a second communication of the first UE 905.

As shown in connection with reference number 1010, the UE 905 may determine whether there is any overlapping between the first SL DRX cycle and the second SL DRX cycle. For example, the UE 905 may determine whether the active state of the first SL DRX cycle overlaps with the active state of the second SL DRX cycle. If the active state of the first SL DRX cycle overlaps with the active state of the second SL DRX cycle, then the UE 905 may proceed to step 1015. If the active state of the first SL DRX cycle does not overlap with the active state of the second SL DRX cycle, then the UE 905 may proceed to step 1030.

As shown in connection with reference number 1015, the UE 905 may determine whether to adjust (e.g., terminate) the active state. In some aspects, the UE 905 may determine whether to adjust the extended portion of the active state of the first SL DRX cycle. The UE 905 may determine to adjust the active state of the first SL DRX cycle based at least in part on a type of information, a priority of information, a latency requirement of information, or an amount of information, among other examples, being transmitted in the active state of the first SL DRX cycle, as described above.

While FIG. 10 shows an example of the UE 905 adjusting the active state of the first SL DRX cycle (e.g., terminating the active state of the first SL DRX) or adjusting the active state of the second SL DRX (e.g., delaying the starting active state of the second SL DRX), the UE 905 may additionally, or alternatively, adjust both the active state of the first SL DRX cycle and the active state of the second SL DRX cycle, as described above in connection with FIG. 9. If the UE 905 determines to adjust the active state of the first SL DRX cycle, then the UE 905 may proceed to step 1020. If the UE 905 determines not to adjust the active state of the first SL DRX cycle, then the UE 905 may proceed to step 1025.

As shown in connection with reference number 1020, the UE 905 may adjust (e.g., terminate) the active state of the first SL DRX cycle and may send an indication to another UE (e.g., UE 910). In some aspects, adjusting the active state of the first DRX cycle may include adjusting (e.g., terminating) the extended portion of the active state of the first SL DRX cycle. The UE 905 may adjust the active state of the first SL DRX cycle based at least in part on determining to adjust the active state of the first SL DRX cycle in step 1015. The UE 905 may adjust the active state of the first SL DRX cycle to remove the overlap with the active state of the second SL DRX cycle. In some aspects, adjusting the active state of the first SL DRX cycle may include adjusting one or more time resources (e.g., adjusting a duration) or one or more frequency resources (e.g., switching a resource pool or frequency range) during the active state of the first SL DRX cycle. The UE 905 may transmit an indication to the UE 910 of whether or not the active state of the first SL DRX cycle has been adjusted. After adjusting the active state of the first SL DRX cycle, the UE 905 may proceed to step 1030.

As shown in connection with reference number 1025, the UE 905 may adjust the active state of the second SL DRX cycle (e.g., delay the active state of the second SL DRX cycle) and/or may keep the active state of the first SL DRX cycle active until the timer expires. The UE 905 may keep the active state of the first SL DRX cycle active until the timer expires based at least in part on determining not to adjust (e.g., terminate) the active state of the first SL DRX cycle in step 1015. As described above, the one or more timers may include an on duration timer, an inactivity timer, a HARQ RTT, or a HARQ retransmission timer, among other examples, associated with the active state of the second SL DRX cycle. Expiration of the one or more timers may correspond to an end of the active state (e.g., the extended portion) of the first SL DRX cycle. After the one or more timers have expired, the UE 905 may proceed to step 1030.

As shown in connection with reference number 1030, the UE 905 may enter the other active state of the other SL DRX (e.g., the active state of the second SL DRX cycle). As described above, the first SL DRX cycle may correspond to a first communication of the UE 905 and the second SL DRX cycle may correspond to a second communication of the UE 905 that is different from the first communication. Entering the active state of the other SL DRX may include switching to the second communication.

As indicated above, FIG. 10 is provided as an example. Other examples may differ from what is described with regard to FIG. 10.

Figure 11:
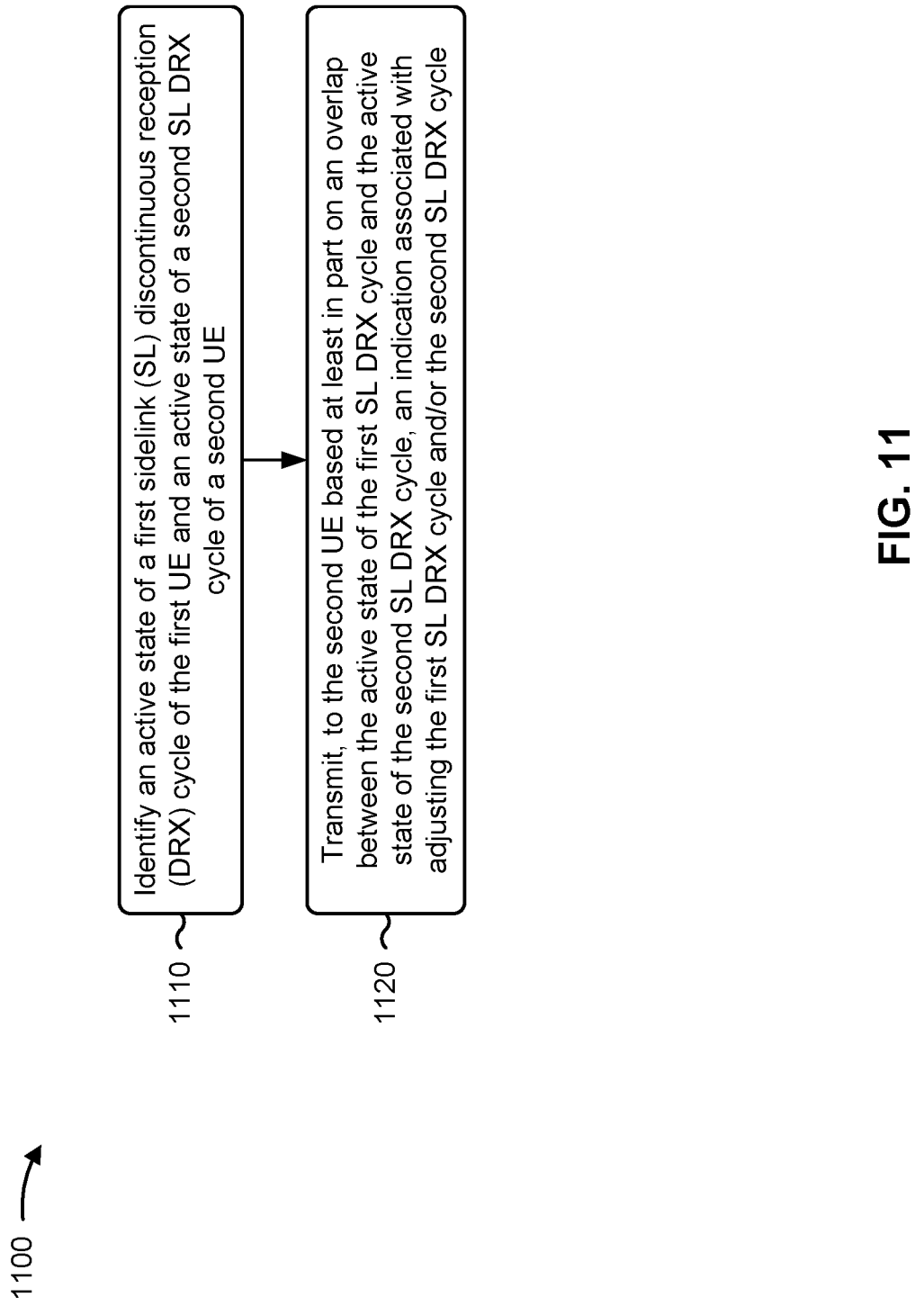
FIG. 11 is a diagram illustrating an example process associated with cooperative operation with SL DRX, in accordance with the present disclosure.

FIG. 11 is a diagram illustrating an example process 1100 performed, for example, by a first UE, in accordance with the present disclosure. Example process 1100 is an example where the first UE (e.g., first UE 120) performs operations associated with cooperative operation with sidelink discontinuous reception.

As shown in FIG. 11, in some aspects, process 1100 may include identifying an active state of a first SL DRX cycle of the first UE and an active state of a second SL DRX cycle of a second UE (block 1110). For example, the first UE (e.g., using communication manager 140 and/or identification component 1308, depicted in FIG. 13) may identify an active state of a first SL DRX cycle of the first UE and an active state of a second SL DRX cycle of a second UE, as described above.

As further shown in FIG. 11, in some aspects, process 1100 may include transmitting, to the second UE based at least in part on an overlap between the active state of the first SL DRX cycle and the active state of the second SL DRX cycle, an indication associated with adjusting the first SL DRX cycle and/or the second SL DRX cycle (block 1120). For example, the first UE (e.g., using communication manager 140 and/or transmission component 1304, depicted in FIG. 13) may transmit, to the second UE based at least in part on an overlap between the active state of the first SL DRX cycle and the active state of the second SL DRX cycle, an indication associated with adjusting the first SL DRX cycle or the second SL DRX cycle, as described above.

Process 1100 may include additional aspects, such as any single aspect or any combination of aspects described below and/or in connection with one or more other processes described elsewhere herein.

In a first aspect, the indication indicates an adjustment, by the first UE, of the first SL DRX cycle.

In a second aspect, alone or in combination with the first aspect, the indication includes an instruction for the second UE to adjust the second SL DRX cycle.

In a third aspect, alone or in combination with one or more of the first and second aspects, the instruction for the second UE to adjust the second SL DRX cycle comprises an instruction for the second UE to adjust one or more timers associated with the second SL DRX cycle.

In a fourth aspect, alone or in combination with one or more of the first through third aspects, the instruction for the second UE to adjust the second SL DRX cycle comprises an instruction for the second UE to delay the active state of the second SL DRX cycle.

In a fifth aspect, alone or in combination with one or more of the first through fourth aspects, the overlap between the active state of the first SL DRX cycle and the active state of the second SL DRX cycle is an overlap between an extended portion of the active state of the first SL DRX cycle and the active state of the second SL DRX cycle.

In a sixth aspect, alone or in combination with one or more of the first through fifth aspects, process 1100 includes adjusting the extended portion of the active state of the first SL DRX cycle.

In a seventh aspect, alone or in combination with one or more of the first through sixth aspects, adjusting the extended portion of the active state of the first SL DRX cycle comprises adjusting a duration of the extended portion of the active state of the first SL DRX cycle.

In an eighth aspect, alone or in combination with one or more of the first through seventh aspects, adjusting the extended portion of the active state of the first SL DRX cycle comprises adjusting one or more of an on duration timer, an inactivity timer, a hybrid automatic repeat request (HARQ) round trip timer (RTT), or a HARQ retransmission timer associated with the first SL DRX cycle.

In a ninth aspect, alone or in combination with one or more of the first through eighth aspects, process 1100 includes switching to a resource pool or a frequency range that does not include one or more overlapping frequency resources between the active state of the first SL DRX cycle and the active state of the second SL DRX cycle.

In a tenth aspect, alone or in combination with one or more of the first through ninth aspects, process 1100 includes receiving, from the second UE, an indication that the second UE has adjusted the second SL DRX cycle.

In an eleventh aspect, alone or in combination with one or more of the first through tenth aspects, process 1100 includes determining whether the active state of the first SL DRX cycle can be adjusted based at least in part on a type of information, a priority of information, a latency requirement of information, or an amount of information being transmitted in the active state of the first SL DRX cycle.

In a twelfth aspect, alone or in combination with one or more of the first through eleventh aspects, the active state of the second SL DRX cycle is identified based at least in part on performing one or more measurements, or receiving one or more communications, in the first SL DRX cycle.

In a thirteenth aspect, alone or in combination with one or more of the first through twelfth aspects, the one or more measurements are SL reference signal received power (RSRP) measurements.

In a fourteenth aspect, alone or in combination with one or more of the first through thirteenth aspects, the SL RSRP measurements are periodic RSRP measurements or are measurements triggered by an occurrence of one or more conditions.

In a fifteenth aspect, alone or in combination with one or more of the first through fourteenth aspects, the one or more communications include SL control information (SCI) received from the second UE.

In a sixteenth aspect, alone or in combination with one or more of the first through fifteenth aspects, the one or more measurements are performed, and the one or more communications are received, in the active state of the first SL DRX cycle.

In a seventeenth aspect, alone or in combination with one or more of the first through sixteenth aspects, the one or more measurements are performed, and the one or more communications are received, outside of the active state of the first SL DRX cycle, and wherein the one or more measurements are performed, and the one or more communications are received, based at least in part on at least one of sliding a sensing window across a frequency range of a component carrier or across a frequency range of multiple transmitting resource pools, or randomly sensing across the frequency range of the component carrier or across the frequency range of the multiple transmitting resource pools.

In an eighteenth aspect, alone or in combination with one or more of the first through seventeenth aspects, transmitting the indication comprises transmitting a sidelink communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
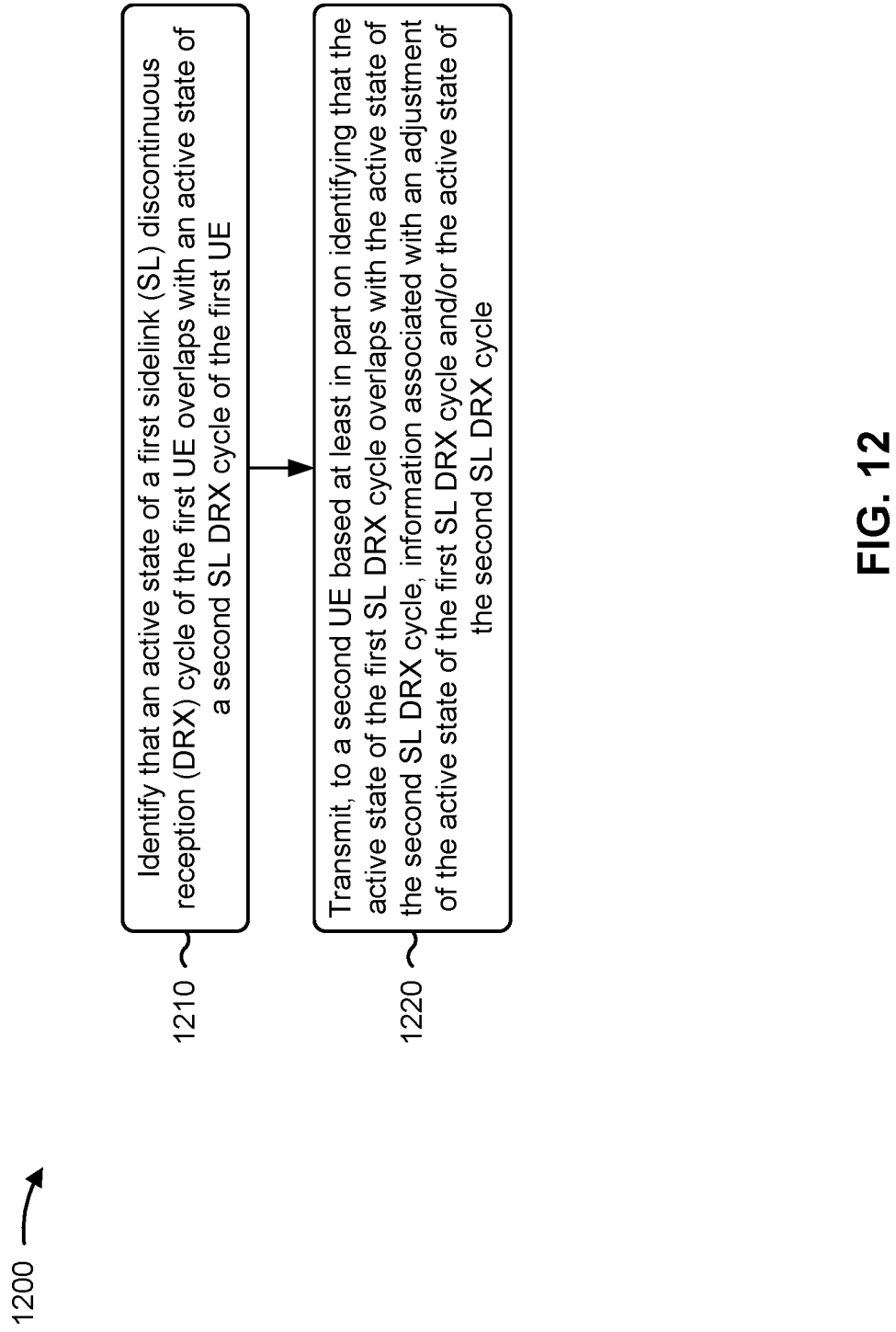
FIG. 12 is a diagram illustrating an example process associated with cooperative operation with SL DRX, in accordance with the present disclosure.

FIG. 12 is a diagram illustrating an example process 1200 performed, for example, by a first UE, in accordance with the present disclosure. Example process 1200 is an example where the first UE (e.g., first UE 120) performs operations associated with cooperative operation with sidelink discontinuous reception.

As shown in FIG. 12, in some aspects, process 1200 may include identifying that an active state of a first SL DRX cycle of the first UE overlaps with an active state of a second SL DRX cycle of the first UE (block 1210). For example, the first UE (e.g., using communication manager 140 and/or identification component 1308, depicted in FIG. 13) may identify that an active state of a first SL DRX cycle of the first UE overlaps with an active state of a second SL DRX cycle of a second UE, as described above.

As further shown in FIG. 12, in some aspects, process 1200 may include transmitting, to a second UE based at least in part on identifying that the active state of the first SL DRX cycle overlaps with the active state of the second SL DRX cycle, information associated with an adjustment of the active state of the first SL DRX cycle and/or the active state of the second SL DRX cycle (block 1220). For example, the first UE (e.g., using communication manager 140 and/or transmission component 1304, depicted in FIG. 13) may transmit, to a second UE based at least in part on identifying that the active state of the first SL DRX cycle overlaps with the active state of the second SL DRX cycle, information associated with an adjustment of the active state of the first SL DRX cycle or the active state of the second SL DRX cycle, as described above.

Process 1200 may include additional aspects, such as any single aspect or any combination of aspects described below and/or in connection with one or more other processes described elsewhere herein.

In a first aspect, process 1200 includes terminating the active state of the first SL DRX cycle.

In a second aspect, alone or in combination with the first aspect, terminating the active state of the first SL DRX cycle comprises terminating at least a portion of the active state of the first SL DRX cycle.

In a third aspect, alone or in combination with one or more of the first and second aspects, process 1200 includes delaying the active state of the second SL DRX cycle.

In a fourth aspect, alone or in combination with one or more of the first through third aspects, delaying the active state of the second SL DRX cycle comprises delaying a start time of the active state of the second SL DRX cycle.

In a fifth aspect, alone or in combination with one or more of the first through fourth aspects, the information associated with the adjustment of the active state of the first SL DRX cycle or the active state of the second SL DRX cycle comprises information associated with a termination of the active state of the first SL DRX cycle or information associated with a delay of the active state of the second SL DRX cycle.

In a sixth aspect, alone or in combination with one or more of the first through fifth aspects, the active state of the first SL DRX cycle that overlaps with the active state of the second SL DRX cycle is an extended portion of the active state of the first SL DRX cycle.

In a seventh aspect, alone or in combination with one or more of the first through sixth aspects, process 1200 includes determining whether the active state of the first SL DRX cycle can be adjusted based at least in part on a type of information, a priority of information, a latency requirement of information, or an amount of information being transmitted in the active state of the first SL DRX cycle.

In an eighth aspect, alone or in combination with one or more of the first through seventh aspects, process 1200 includes transmitting, to the second UE, an indication for the second UE to adjust an active state of the first SL DRX cycle or an active state of the second SL DRX cycle.

In a ninth aspect, alone or in combination with one or more of the first through eighth aspects, transmitting the information comprises transmitting a sidelink communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
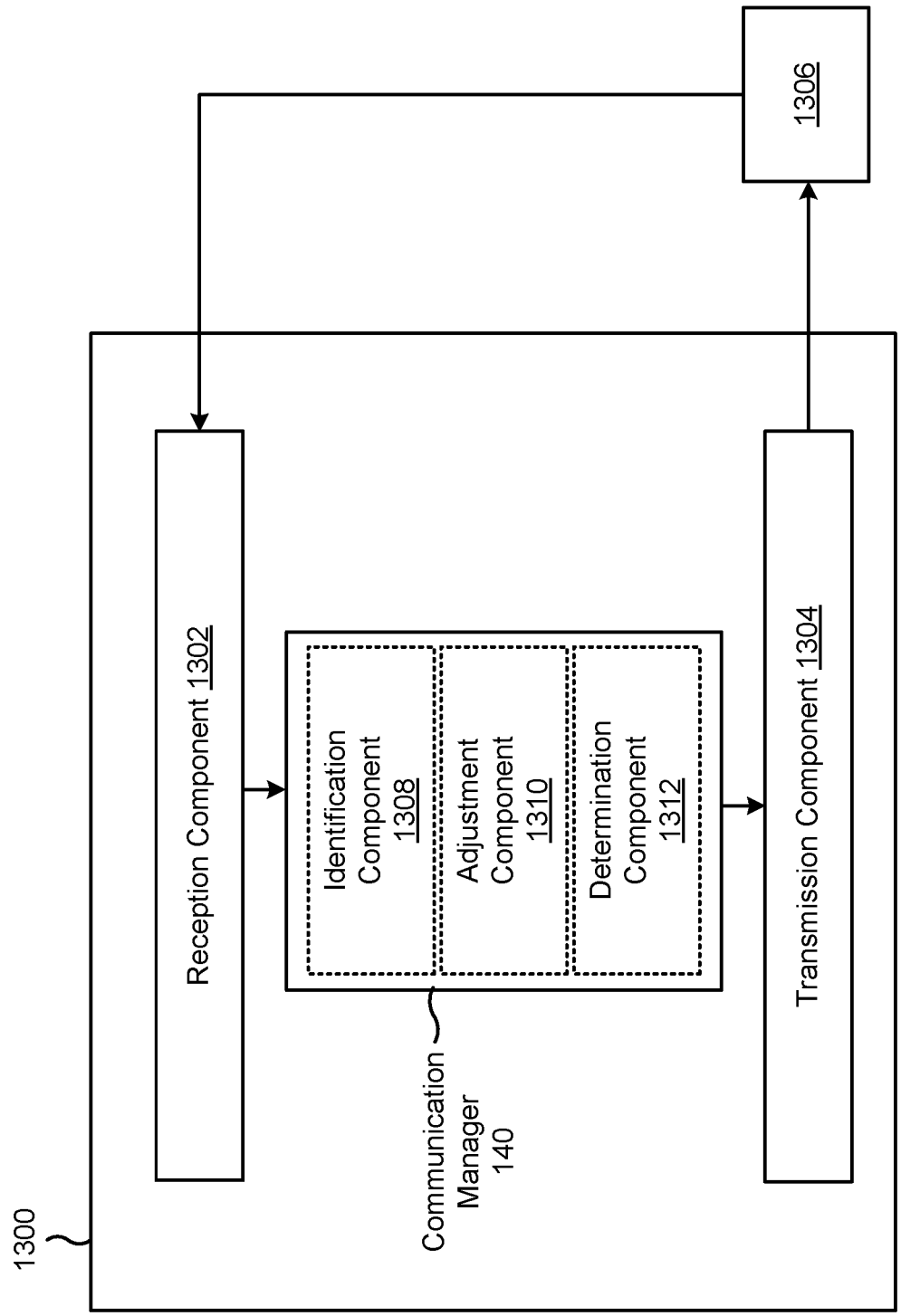
FIG. 13 is a diagram of an example apparatus for wireless communication, in accordance with the present disclosure.

FIG. 13 is a diagram of an example apparatus 1300 for wireless communication. The apparatus 1300 may be a first UE, or a first UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of an identification component 1308, an adjustment component 1310, or a determination component 1312, among other examples.

In some aspects, the apparatus 1300 may be configured to perform one or more operations described herein in connection with FIGS. 5-10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the first UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the first UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the first UE described in connection with FIG. 2. In some aspects, the transmission component 1304 may be co-located with the reception component 1302 in a transceiver.

The identification component 1308 may identify an active state of a first SL DRX cycle of the first UE and an active state of a second SL DRX cycle of a second UE. The transmission component 1304 may transmit, to the second UE based at least in part on an overlap between the active state of the first SL DRX cycle and the active state of the second SL DRX cycle, an indication associated with adjusting the first SL DRX cycle or the second SL DRX cycle.

The adjustment component 1310 may adjust the extended portion of the active state of the first SL DRX cycle.

The adjustment component 1310 may switch to a resource pool or a frequency range that does not include one or more overlapping frequency resources between the active state of the first SL DRX cycle and the active state of the second SL DRX cycle.

The reception component 1302 may receive, from the second UE, an indication that the second UE has adjusted the second SL DRX cycle.

The determination component 1312 may determine whether the active state of the first SL DRX cycle can be adjusted based at least in part on a type of information, a priority of information, a latency requirement of information, or an amount of information being transmitted in the active state of the first SL DRX cycle.

The identification component 1308 may identify that an active state of a first SL DRX cycle of the first UE overlaps with an active state of a second SL DRX cycle of the first UE. The transmission component 1304 may transmit, to a second UE based at least in part on identifying that the active state of the first SL DRX cycle overlaps with the active state of the second SL DRX cycle, information associated with an adjustment of the active state of the first SL DRX cycle or the active state of the second SL DRX cycle.

The adjustment component 1310 may terminate the active state of the first SL DRX cycle.

The adjustment component 1310 may delay the active state of the second SL DRX cycle.

The determination component 1312 may determine whether the active state of the first SL DRX cycle can be adjusted based at least in part on a type of information, a priority of information, a latency requirement of information, or an amount of information being transmitted in the active state of the first SL DRX cycle.

The transmission component 1304 may transmit, to the second UE, an indication for the second UE to adjust an active state of the first SL DRX cycle or an active state of the second SL DRX cycle.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: identifying an active state of a first sidelink (SL) discontinuous reception (DRX) cycle of the first UE and an active state of a second SL DRX cycle of a second UE; and transmitting, to the second UE based at least in part on an overlap between the active state of the first SL DRX cycle and the active state of the second SL DRX cycle, an indication associated with adjusting the first SL DRX cycle or the second SL DRX cycle.

Aspect 2: The method of Aspect 1, wherein the indication indicates an adjustment, by the first UE, of the first SL DRX cycle.

Aspect 3: The method of any of Aspects 1-2, wherein the indication includes an instruction for the second UE to adjust the second SL DRX cycle.

Aspect 4: The method of Aspect 3, wherein the instruction for the second UE to adjust the second SL DRX cycle comprises an instruction for the second UE to adjust one or more timers associated with the second SL DRX cycle.

Aspect 5: The method of Aspect 3, wherein the instruction for the second UE to adjust the second SL DRX cycle comprises an instruction for the second UE to delay the active state of the second SL DRX cycle.

Aspect 6: The method of any of Aspects 1-5, wherein the overlap between the active state of the first SL DRX cycle and the active state of the second SL DRX cycle is an overlap between an extended portion of the active state of the first SL DRX cycle and the active state of the second SL DRX cycle.

Aspect 7: The method of Aspect 6, further comprising adjusting the extended portion of the active state of the first SL DRX cycle.

Aspect 8: The method of Aspect 7, wherein adjusting the extended portion of the active state of the first SL DRX cycle comprises adjusting a duration of the extended portion of the active state of the first SL DRX cycle.

Aspect 9: The method of Aspect 7, wherein adjusting the extended portion of the active state of the first SL DRX cycle comprises adjusting one or more of an on duration timer, an inactivity timer, a hybrid automatic repeat request (HARQ) round trip timer (RTT), or a HARQ retransmission timer associated with the first SL DRX cycle.

Aspect 10: The method of any of Aspects 1-9, further comprising switching to a resource pool or a frequency range that does not include one or more overlapping frequency resources between the active state of the first SL DRX cycle and the active state of the second SL DRX cycle.

Aspect 11: The method of any of Aspects 1-10, further comprising receiving, from the second UE, an indication that the second UE has adjusted the second SL DRX cycle.

Aspect 12: The method of any of Aspects 1-11, further comprising determining whether the active state of the first SL DRX cycle can be adjusted based at least in part on a type of information, a priority of information, a latency requirement of information, or an amount of information being transmitted in the active state of the first SL DRX cycle.

Aspect 13: The method of any of Aspects 1-12, wherein the active state of the second SL DRX cycle is identified based at least in part on performing one or more measurements, or receiving one or more communications, in the first SL DRX cycle.

Aspect 14: The method of Aspect 13, wherein the one or more measurements are SL reference signal received power (RSRP) measurements.

Aspect 15: The method of Aspect 14, wherein the SL RSRP measurements are periodic RSRP measurements or are measurements triggered by an occurrence of one or more conditions.

Aspect 16: The method of Aspect 13, wherein the one or more communications include SL control information (SCI) received from the second UE.

Aspect 17: The method of Aspect 13, wherein the one or more measurements are performed, and the one or more communications are received, in the active state of the first SL DRX cycle.

Aspect 18: The method of Aspect 13, wherein the one or more measurements are performed, and the one or more communications are received, outside of the active state of the first SL DRX cycle, and wherein the one or more measurements are performed, and the one or more communications are received, based at least in part on at least one of: sliding a sensing window across a frequency range of a component carrier or across a frequency range of multiple transmitting resource pools, or randomly sensing across the frequency range of the component carrier or across the frequency range of the multiple transmitting resource pools.

Aspect 19: The method of any of Aspects 1-18, wherein transmitting the indication comprises transmitting a sidelink communication.

Aspect 20: A method of wireless communication performed by a first user equipment (UE), comprising: identifying that an active state of a first sidelink (SL) discontinuous reception (DRX) cycle of the first UE overlaps with an active state of a second SL DRX cycle of the first UE; and transmitting, to a second UE based at least in part on identifying that the active state of the first SL DRX cycle overlaps with the active state of the second SL DRX cycle, information associated with an adjustment of the active state of the first SL DRX cycle or the active state of the second SL DRX cycle.

Aspect 21: The method of Aspect 20, further comprising terminating the active state of the first SL DRX cycle.

Aspect 22: The method of Aspect 21, wherein terminating the active state of the first SL DRX cycle comprises terminating at least a portion of the active state of the first SL DRX cycle.

Aspect 23: The method of any of Aspects 20-22, further comprising delaying the active state of the second SL DRX cycle.

Aspect 24: The method of Aspect 23, wherein delaying the active state of the second SL DRX cycle comprises delaying a start time of the active state of the second SL DRX cycle.

Aspect 25: The method of any of Aspects 20-24, wherein the information associated with the adjustment of the active state of the first SL DRX cycle or the active state of the second SL DRX cycle comprises information associated with a termination of the active state of the first SL DRX cycle or information associated with a delay of the active state of the second SL DRX cycle.

Aspect 26: The method of any of Aspects 20-25, wherein the active state of the first SL DRX cycle that overlaps with the active state of the second SL DRX cycle is an extended portion of the active state of the first SL DRX cycle.

Aspect 27: The method of any of Aspects 20-26, further comprising determining whether the active state of the first SL DRX cycle can be adjusted based at least in part on a type of information, a priority of information, a latency requirement of information, or an amount of information being transmitted in the active state of the first SL DRX cycle.

Aspect 28: The method of any of Aspects 20-27, further comprising transmitting, to the second UE, an indication for the second UE to adjust an active state of the first SL DRX cycle or an active state of the second SL DRX cycle.

Aspect 29: The method of any of Aspects 20-28, wherein transmitting the information comprises transmitting a sidelink communication.

Aspect 30: An apparatus for wireless communication at a device, comprising a processor; memory coupled with the processor; and instructions stored in the memory and executable by the processor to cause the apparatus to perform the method of one or more of Aspects 1-19.

Aspect 31: A device for wireless communication, comprising a memory and one or more processors coupled to the memory, the one or more processors configured to perform the method of one or more of Aspects 1-19.

Aspect 32: An apparatus for wireless communication, comprising at least one means for performing the method of one or more of Aspects 1-19.

Aspect 33: A non-transitory computer-readable medium storing code for wireless communication, the code comprising instructions executable by a processor to perform the method of one or more of Aspects 1-19.

Aspect 34: A non-transitory computer-readable medium storing a set of instructions for wireless communication, the set of instructions comprising one or more instructions that, when executed by one or more processors of a device, cause the device to perform the method of one or more of Aspects 1-19.

Aspect 35: An apparatus for wireless communication at a device, comprising a processor; memory coupled with the processor; and instructions stored in the memory and executable by the processor to cause the apparatus to perform the method of one or more of Aspects 20-29.

Aspect 36: A device for wireless communication, comprising a memory and one or more processors coupled to the memory, the one or more processors configured to perform the method of one or more of Aspects 20-29.

Aspect 37: An apparatus for wireless communication, comprising at least one means for performing the method of one or more of Aspects 20-29.

Aspect 38: A non-transitory computer-readable medium storing code for wireless communication, the code comprising instructions executable by a processor to perform the method of one or more of Aspects 20-29.

Aspect 39: A non-transitory computer-readable medium storing a set of instructions for wireless communication, the set of instructions comprising one or more instructions that, when executed by one or more processors of a device, cause the device to perform the method of one or more of Aspects 20-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, the one or more processors individually or collectively configured to:

identify an active state of a first sidelink (SL) discontinuous reception (DRX) cycle of the first UE and an active state of a second SL DRX cycle of a second UE, wherein the active state of the second SL DRX cycle is identified based at least in part on performing one or more reference signal measurements; and transmit, to the second UE based at least in part on an overlap between the active state of the first SL DRX cycle and the active state of the second SL DRX cycle, an indication associated with adjusting the first SL DRX cycle or the second SL DRX cycle.

2. The apparatus of claim 1, wherein the indication indicates an adjustment, by the first UE, of the first SL DRX cycle.

3. The apparatus of claim 1, wherein the indication includes an instruction for the second UE to adjust the second SL DRX cycle.

4. The apparatus of claim 3, wherein the instruction for the second UE to adjust the second SL DRX cycle comprises an instruction for the second UE to adjust one or more timers associated with the second SL DRX cycle.

5. The apparatus of claim 3, wherein the instruction for the second UE to adjust the second SL DRX cycle comprises an instruction for the second UE to delay the active state of the second SL DRX cycle.

6. The apparatus of claim 1, wherein the overlap between the active state of the first SL DRX cycle and the active state of the second SL DRX cycle is an overlap between an extended portion of the active state of the first SL DRX cycle and the active state of the second SL DRX cycle.

7. The apparatus of claim 6, wherein the one or more processors are further individually or collectively configured to adjust the extended portion of the active state of the first SL DRX cycle.

8. The apparatus of claim 7, wherein the one or more processors, to adjust the extended portion of the active state of the first SL DRX cycle, are individually or collectively configured to adjust one or more of an on duration timer, an inactivity timer, a hybrid automatic repeat request (HARQ) round trip timer (RTT), or a HARQ retransmission timer associated with the first SL DRX cycle.

9. The apparatus of claim 1, wherein the one or more processors are further individually or collectively configured to switch to a resource pool or a frequency range that does not include one or more overlapping frequency resources between the active state of the first SL DRX cycle and the active state of the second SL DRX cycle.

10. The apparatus of claim 1, wherein the one or more processors are further individually or collectively configured to receive, from the second UE, an indication that the second UE has adjusted the second SL DRX cycle.

11. The apparatus of claim 1, wherein the one or more processors are further individually or collectively configured to determine whether the active state of the first SL DRX cycle can be adjusted based at least in part on a type of information, a priority of information, a latency requirement of information, or an amount of information being transmitted in the active state of the first SL DRX cycle.

12. The apparatus of claim 1, wherein the active state of the second SL DRX cycle is identified based at least in part on receiving one or more communications, in the first SL DRX cycle.

13. An apparatus for wireless communication at a first user equipment (UE), comprising:
one or more memories; and
one or more processors, coupled to the one or more memories, the one or more processors individually or collectively configured to:
identify that an active state of a first sidelink (SL) discontinuous reception (DRX) cycle of the first UE overlaps with an active state of a second SL DRX cycle of a second UE, wherein the active state of the second SL DRX cycle is identified based at least in part on performing one or more reference signal measurements; and
transmit, to Hall the second UE based at least in part on identifying that the active state of the first SL DRX cycle overlaps with the active state of the second SL DRX cycle, information associated with an adjustment of the active state of the first SL DRX cycle or the active state of the second SL DRX cycle.

14. The apparatus of claim 13, wherein the one or more processors are further individually or collectively configured to terminate the active state of the first SL DRX cycle.

15. The apparatus of claim 14, wherein the one or more processors, to terminate the active state of the first SL DRX cycle, are individually or collectively configured to terminate at least a portion of the active state of the first SL DRX cycle.

16. The apparatus of claim 13, wherein the one or more processors are further individually or collectively configured to delay the active state of the second SL DRX cycle.

17. The apparatus of claim 16, wherein the one or more processors, to delay the active state of the second SL DRX cycle, are individually or collectively configured to delay a start time of the active state of the second SL DRX cycle.

18. The apparatus of claim 13, wherein the information associated with the adjustment of the active state of the first SL DRX cycle or the active state of the second SL DRX cycle comprises information associated with a termination of the active state of the first SL DRX cycle or information associated with a delay of the active state of the second SL DRX cycle.

19. The apparatus of claim 13, wherein the active state of the first SL DRX cycle that overlaps with the active state of the second SL DRX cycle is an extended portion of the active state of the first SL DRX cycle.

20. The apparatus of claim 13, wherein the one or more processors are further individually or collectively configured to determine whether the active state of the first SL DRX cycle can be adjusted based at least in part on a type of information, a priority of information, a latency requirement of information, or an amount of information being transmitted in the active state of the first SL DRX cycle.

21. The apparatus of claim 13, wherein the one or more processors are further individually or collectively configured to transmit, to the second UE, an indication for the second UE to adjust an active state of the first SL DRX cycle or an active state of the second SL DRX cycle.

22. The apparatus of claim 13, wherein the one or more processors, to transmit the information, are individually or collectively configured to transmit a sidelink communication.

23. A method of wireless communication performed by a first user equipment (UE), comprising:
identifying an active state of a first sidelink (SL) discontinuous reception (DRX) cycle of the first UE and an active state of a second SL DRX cycle of a second UE, wherein the active state of the second SL DRX cycle is identified based at least in part on performing one or more reference signal measurements; and transmitting, to the second UE based at least in part on an overlap between the active state of the first SL DRX cycle and the active state of the second SL DRX cycle, an indication associated with adjusting the first SL DRX cycle or the second SL DRX cycle.

24. The method of claim 23, wherein the indication indicates an adjustment, by the first UE, of the first SL DRX cycle.

25. The method of claim 23, wherein the indication includes an instruction for the second UE to adjust the second SL DRX cycle.

26. The method of claim 25, wherein the instruction for the second UE to adjust the second SL DRX cycle comprises an instruction for the second UE to delay the active state of the second SL DRX cycle.

27. A method of wireless communication performed by a first user equipment (UE), comprising:
  identifying that an active state of a first sidelink (SL) discontinuous reception (DRX) cycle of the first UE overlaps with an active state of a second SL DRX cycle of a second UE, wherein the active state of the second SL DRX cycle is identified based at least in part on performing one or more reference signal measurements; and
  transmitting, to Hall the second UE based at least in part on identifying that the active state of the first SL DRX cycle overlaps with the active state of the second SL DRX cycle, information associated with an adjustment of the active state of the first SL DRX cycle or the active state of the second SL DRX cycle.

28. The method of claim 27, further comprising terminating the active state of the first SL DRX cycle.

29. The method of claim 28, wherein terminating the active state of the first SL DRX cycle comprises terminating at least a portion of the active state of the first SL DRX cycle.

30. The method of claim 27, further comprising delaying the active state of the second SL DRX cycle.

* * * * *